US008603653B2

(12) United States Patent  
Matsumoto et al.

(10) Patent No.: US 8,603,653 B2  
(45) Date of Patent: Dec. 10, 2013

(54) GLASS FOR MAGNETIC RECORDING MEDIUM SUBSTRATE, MAGNETIC RECORDING MEDIUM SUBSTRATE AND METHOD OF MANUFACTURING THE SAME, AND MAGNETIC RECORDING MEDIUM

(75) Inventors: Naomi Matsumoto, Shinjuku-ku (JP); Yoichi Hachitani, Shinjuku-ku (JP); Kinobu Osakabe, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/853,802

(22) Filed: Aug. 10, 2010

(65) Prior Publication Data

US 2011/0123832 A1    May 26, 2011

(30) Foreign Application Priority Data

Aug. 10, 2009 (JP) ................................. 2009-185976

(51) Int. Cl.  
*C03C 3/095* (2006.01)  
*G11B 17/08* (2006.01)

(52) U.S. Cl.  
USPC ....................................... 428/846.9; 360/135

(58) Field of Classification Search  
USPC ............ 428/846.9, 848, 848.2, 848.3, 848.8, 428/426, 141; 501/11, 32, 63, 64, 69, 65, 501/70, 72, 102; 360/135, 136; 65/374.13  
See application file for complete search history.

(56) References Cited

U.S. PATENT DOCUMENTS

| 5,776,844 | A | 7/1998 | Koch et al. |
| 5,780,371 | A | 7/1998 | Rifqi et al. |
| 5,858,897 | A | 1/1999 | Maeda et al. |
| 5,900,296 | A | 5/1999 | Hayashi et al. |
| 5,958,812 | A | 9/1999 | Koch et al. |
| 6,387,510 | B1 | 5/2002 | Nakashima et al. |
| 6,949,485 | B2 | 9/2005 | Nakashima et al. |

(Continued)

FOREIGN PATENT DOCUMENTS

| JP | 09-507206 A | 7/1997 |
| JP | 10-152338 A | 6/1998 |

(Continued)

OTHER PUBLICATIONS

Michael A. Seigler et al., "Integrated Heat Assisted Magnetic Recording Head: Design and Recording Demonstration", IEEE Transactions on Magnetics, Jan. 2008, pp. 119-124, vol. 4, No. 1.

(Continued)

*Primary Examiner* — Kevin M. Bernatz  
*Assistant Examiner* — Louis Falasco  
(74) *Attorney, Agent, or Firm* — Sughrue Mion, PLLC

(57) ABSTRACT

An aspect of the present invention relates to glass for a magnetic recording medium substrate, which comprises, denoted as molar percentages, 50 to 75 percent of $SiO_2$, 0 to 5 percent of $Al_2O_3$, 0 to 3 percent of $Li_2O$, 0 to 5 percent of ZnO, a total of $Na_2O$ and $K_2O$ of 3 to 15 percent, a total of MgO, CaO, SrO, and BaO of 14 to 35 percent, a total of $ZrO_2$, $TiO_2$, $La_2O_3$, $Y_2O_3$, $Yb_2O_3$, $Ta_2O_5$, $Nb_2O_5$, and $HfO_2$ of 2 to 9 percent, with a molar ratio of {(MgO+CaO)/(MgO+CaO+SrO+BaO)} falling within a range of 0.85 to 1, and a molar ratio of {$Al_2O_3$/(MgO+CaO)} falling within a range of 0 to 0.30.

20 Claims, 1 Drawing Sheet

(56) References Cited

U.S. PATENT DOCUMENTS

| | | |
|---|---|---|
| 7,189,438 B2 | 3/2007 | Momose et al. |
| 7,462,411 B2 | 12/2008 | Ikenishi et al. |
| 7,595,273 B2 | 9/2009 | Ikenishi et al. |
| 7,601,446 B2 | 10/2009 | Ikenishi et al. |
| 7,687,419 B2 | 3/2010 | Kawai |
| 2002/0164505 A1* | 11/2002 | Yokoyama et al. ........ 428/846.9 |
| 2004/0229006 A1 | 11/2004 | Momose et al. |
| 2005/0164036 A1* | 7/2005 | Zou ............................ 428/846.9 |
| 2005/0215414 A1 | 9/2005 | Kawai |
| 2005/0244656 A1 | 11/2005 | Ikenishi et al. |
| 2006/0216552 A1 | 9/2006 | Ikenishi et al. |
| 2007/0032366 A1* | 2/2007 | Kasuga et al. ................. 501/64 |
| 2009/0239102 A1* | 9/2009 | Nagashima et al. ....... 428/846.9 |

FOREIGN PATENT DOCUMENTS

| | | |
|---|---|---|
| JP | 2000-357318 A | 12/2000 |
| JP | 2001-058843 A | 3/2001 |
| JP | 2001-134925 A | 5/2001 |
| JP | 2001-172043 A | 6/2001 |
| JP | 2001-294441 A | 10/2001 |
| JP | 2001-348246 A | 12/2001 |
| JP | 2002-029774 A | 1/2002 |
| JP | 2004-043295 A | 2/2004 |
| JP | 2004-362746 A | 12/2004 |
| JP | 2005-272212 A | 10/2005 |
| JP | 2005-314159 A | 11/2005 |
| JP | 2005-343729 A | 12/2005 |
| JP | 2006-206336 A | 8/2006 |
| JP | 2006-327935 A | 12/2006 |
| JP | 2007-051064 A | 3/2007 |
| WO | 03/102928 A1 | 12/2003 |
| WO | 2008/062847 A1 | 5/2008 |
| WO | WO 2009/096120 * | 8/2009 ............... G11B 5/73 |

OTHER PUBLICATIONS

Jian-Gang Zhu et al., "Microwave Assisted Magnetic Recording", IEEE Transactions on Magnetics, Jan. 2008, pp. 125-131, vol. 44, No. 1.

* cited by examiner

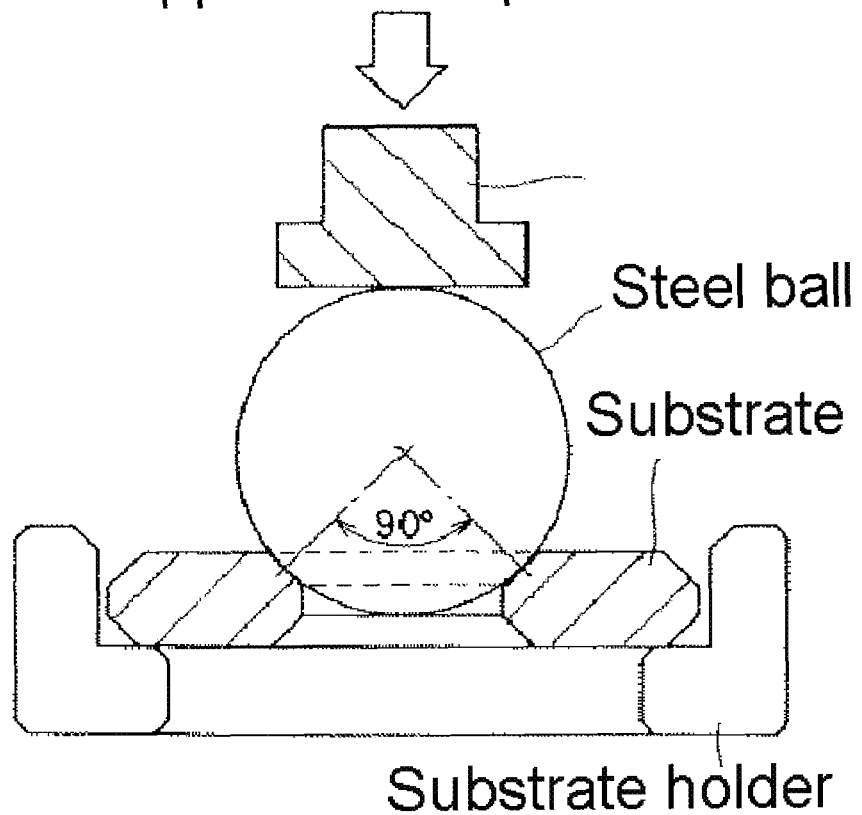

GLASS FOR MAGNETIC RECORDING MEDIUM SUBSTRATE, MAGNETIC RECORDING MEDIUM SUBSTRATE AND METHOD OF MANUFACTURING THE SAME, AND MAGNETIC RECORDING MEDIUM

CROSS-REFERENCE TO RELATED APPLICATIONS

This application claims the benefit of priority to Japanese Patent Application No. 2009-185976, filed on Aug. 10, 2009, which is expressly incorporated herein by reference in its entirety.

BACKGROUND OF THE INVENTION

1. Field of the Invention

The present invention relates to glass employed as a substrate in magnetic recording media such as hard disks, to a magnetic recording medium substrate comprised of the above glass, to a method of manufacturing the same, and to a magnetic recording medium comprising the above substrate.

2. Discussion of the Background

With the development of information-related infrastructure such as the Internet, the need for information recording media such as magnetic disks and optical disks has increased sharply. The main structural components of the magnetic memory devices of computers and the like are magnetic recording media and magnetic heads for magnetic recording and reproduction. Known magnetic recording media include flexible disks and hard disks. Of these, examples of the substrate materials employed in hard disks (magnetic disks) include aluminum substrates, glass substrates, ceramic substrates, and carbon substrates. In practical terms, depending on size and application, aluminum substrates and glass substrates are primarily employed. In the hard disk drives of laptop computers, in addition to impact resistance, higher density recording, and the development of thinner magnetic recording media, the requirements of increased surface smoothness of the disk substrate and the development of thinner substrates are intensifying. Thus, there are limits to how well aluminum substrates, with afford poor surface hardness and rigidity, can respond. Accordingly, the development of glass substrates is currently the mainstream (for example, see Document 1 (Published Japanese Translation of a PCT international publication for patent application (TOKUHYO) No. Heisei 9-507206), Document 2 (Japanese Unexamined Patent Publication (KOKAI) No. 2007-51064), Document 3 (Japanese Unexamined Patent Publication (KOKAI) No. 2001-294441), Document 4 (Japanese Unexamined Patent Publication (KOKAI) No. 2001-134925), Document 5 (Japanese Unexamined Patent Publication (KOKAI) No. 2001-348246), Document 6 (Japanese Unexamined Patent Publication (KOKAI) No. 2001-58843), Document 7 (Japanese Unexamined Patent Publication (KOKAI) No. 2006-327935), Document 8 (Japanese Unexamined Patent Publication (KOKAI) No. 2005-272212), or English language family members US 2005/215414A1 and U.S. Pat. No. 7,687,419, Document 9 (Japanese Unexamined Patent Publication (KOKAI) No. 2004-43295), Document 10 (Japanese Unexamined Patent Publication (KOKAI) No. 2005-314159), or English language family members US 2005/244656A1 and U.S. Pat. No. 7,595,273; which are expressly incorporated herein by reference in their entirety).

In recent years, with the goal of achieving even higher density recording in magnetic recording media, the use of magnetic materials of high magneto-anisotropic energy (magnetic materials of high Ku value), such as Fe—Pt and Co—Pt based materials, is being examined (for example, see Document 11 (Japanese Unexamined Patent Publication (KOKAI) No. 2004-362746) or English language family members US 2004/229006A1 and U.S. Pat. No. 7,189,438; which is expressly incorporated herein by reference in its entirety). It is necessary to reduce the particle diameter of the magnetic particles to achieve higher density recording. However, when just the particle diameter is reduced, the deterioration of magnetic characteristics due to thermal fluctuation becomes a problem. Magnetic materials of high Ku value tend not to be affected by thermal fluctuation, and are thus expected to contribute to the achievement of greater recording density.

However, the above-described magnetic materials of high Ku value must be in a specific state of crystal orientation to exhibit a high Ku value. Thus, a film must be formed at high temperature or thermoprocessing must be conducted at high temperature following film formation. Accordingly, the formation of a magnetic recording layer comprised of such magnetic materials of high Ku value requires that a glass substrate have high heat resistance that is capable of withstanding the above-described processing at high temperatures, that is, have a high glass transition temperature.

By the way, in disk-shaped magnetic recording media, data are written and read in the direction of rotation by radially displacing a magnetic head while rotating the medium at high speed about a center axis. In recent years, the rotational speed has been increased from 5,400 rpm to 7,200 rpm, and up to a high speed of 10,000 rpm to increase the writing rate and reading rate. However, in disk-shaped magnetic recording media, since the positions at which data are recorded are assigned in advance based on the distance from the center axis, when the disk deforms during rotation, the magnetic head develops a positional displacement, compromising proper reading. Accordingly, to cope with higher rotational speeds described above, the glass substrate is required to have high rigidity (Young's modulus and specific modulus of elasticity) so as to prevent substantial deformation during high-speed rotation.

Based on investigations by the present inventors, it was revealed that the use of a glass substrate with a high coefficient of thermal expansion permitted an increase in the reliability of recording and reproduction with magnetic recording media for the following reasons.

HDDs (hard disk drives), in which magnetic recording media are loaded, are configured such that the spindle of a spindle motor presses against the center portion, causing the magnetic recording medium itself to rotate. Thus, when there is a substantial difference in the coefficient of thermal expansion of the substrate of the magnetic recording medium and spindle material constituting the spindle portion, a discrepancy ends up developing between the thermal expansion and contraction of the spindle and those of the substrate of the magnetic recording medium in response to change in the surrounding temperature during use. As a result, the phenomenon in which the magnetic recording medium ends up changing shape occurs. When such phenomenon occurs, information that has been written cannot be read by a head, compromising recording and reproduction reliability. Accordingly, enhancing the reliability of magnetic recording media requires that glass substrates have high coefficient of thermal expansion similar to that of the spindle material (such as stainless steel).

As set forth above, it is required for a glass substrate to have the three characteristics of high heat resistance, high rigidity, and a high coefficient of thermal expansion to provide a magnetic recording medium capable of handling higher recording densities. However, based on investigation by the present inventors, conventional glass substrates, including the glass substrates described in Documents 1 to 10 above, do not simultaneously possess these three characteristics. This is because there is a trade-off between these three characteristics, making it difficult to achieve a glass substrate satisfying all three.

SUMMARY OF THE INVENTION

An aspect of the present invention provides for a glass substrate having all three characteristics of high thermal resistance, high rigidity, and a high coefficient of thermal expansion, and more particularly, a glass substrate having a high glass transition temperature, a high Young's modulus, and a high coefficient of thermal expansion.

The present inventors repeatedly trial manufactured and evaluated a large number of glass compositions in an attempt to achieve the above object by trial and error. As a result, they found that a glass having the following composition possessed all three characteristics that were conventionally been difficult to achieve simultaneously, namely, high heat resistance, high rigidity, and a high coefficient of thermal expansion. The present invention was devised on that basis.

An aspect of the present invention relates to:

glass for a magnetic recording medium substrate, which comprises, denoted as molar percentages, 50 to 75 percent of $SiO_2$,
0 to 5 percent of $Al_2O_3$,
0 to 3 percent of $Li_2O$,
0 to 5 percent of ZnO,
a total of $Na_2O$ and $K_2O$ of 3 to 15 percent,
a total of MgO, CaO, SrO, and BaO of 14 to 35 percent,
a total of $ZrO_2$, $TiO_2$, $La_2O_3$, $Y_2O_3$, $Yb_2O_3$, $Ta_2O_5$, $Nb_2O_5$, and $HfO_2$ of 2 to 9 percent,
with a molar ratio of {(MgO+CaO)/(MgO+CaO+SrO+BaO)} falling within a range of 0.85 to 1, and a molar ratio of {$Al_2O_3$/(MgO+CaO)} falling within a range of 0 to 0.30.

The above glass may have an average coefficient of linear expansion of equal to or greater than $70 \times 10^{-7}/°$ C. at 100 to 300° C., a glass transition temperature of equal to or higher than 630° C., and a Young's modulus of equal to or higher than 80 GPa.

The above glass may have a specific modulus of elasticity of equal to or greater than 30 MNm/kg.

The above glass may have a specific gravity of less than 3.0.

The above glass may have an acid resistance in the form of an etching rate of equal to or less than 0.09 μm/minute when immersed in 1.7 mass percent hydrofluosilicic acid aqueous solution maintained at 45° C.

The above glass may have a liquidus temperature of equal to or lower than 1,300° C.

The above glass may comprise, denoted as molar percentages, 50 to 75 percent of $SiO_2$,
0 to 3 percent of $B_2O_3$,
0 to 5 percent of $Al_2O_3$,
0 to 3 percent of $Li_2O$,
0 to 5 percent of $Na_2O$,
1 to 10 percent of $K_2O$,
1 to 23 percent of MgO,
6 to 21 percent of CaO,
0 to 5 percent of BaO,
0 to 5 percent of ZnO,
0 to 5 percent of $TiO_2$,
2 to 9 percent of $ZrO_2$.

The $SiO_2$ content of the above glass may fall within a range of 57 to 68 molar percent.

The $Al_2O_3$ content of the above glass may fall within a range of 0.1 to 4 molar percent.

The above glass may be glass containing substantially no $Li_2O$.

The ZnO content of the above glass may fall within a range of 0 to 2 molar percent.

A further aspect of the present invention relates to a magnetic recording medium substrate comprised of the above glass.

The above magnetic recording medium substrate may comprise an ion-exchange layer over a part or all of the surface thereof.

The ion-exchange layer may have been formed by ion exchange with at least one alkali metal ion selected from the group consisting of K, Rb, and Cs.

The magnetic recording medium substrate may be disk-shaped and have a main surface with surface properties (1) to (3) below:
(1) an arithmetic average surface roughness Ra measured over an area of 1 μm×1 μm by an atomic force microscope of equal to or lower than 0.25 nm;
(2) an arithmetic average surface roughness Ra measured over an area of 5 μm×5 μm of equal to or lower than 0.15 nm;
(3) an arithmetic average surface waviness Wa at a wavelength of 100 μm to 950 μm of equal to or lower than 0.5 nm.

A still further aspect of the present invention relates to a method of manufacturing a magnetic recording medium substrate by preparing a glass melt by heating glass starting materials; using a method of press molding, down draw, or floating to mold the glass melt into a plate shape; and employing a step of processing the plate-shaped glass obtained to produce the above magnetic recording medium.

A still further aspect of the present invention relates to a magnetic recording medium comprising a magnetic recording layer on the above substrate.

The magnetic recording layer may contain either Fe and Pt or Co and Pt.

The magnetic recording medium may be employed in an energy-assisted recording method.

EFFECT OF THE INVENTION

The present invention can provide glass for a magnetic recording medium substrate that can achieve a glass substrate for a magnetic recording medium having high heat resistance capable of withstanding high-temperature heat processing in the course of forming a magnetic recording layer comprised of a high Ku value magnetic material, having a high coefficient of thermal expansion matching that of the support member (spindle), and having high rigidity capable of withstanding high-speed rotation; a magnetic recording medium substrate comprised of this glass; a method of manufacturing the same; and a magnetic recording medium comprising this substrate.

BRIEF DESCRIPTION OF THE DRAWINGS

FIG. 1 is a drawing descriptive of the method of measuring deflecting strength.

DETAILED DESCRIPTION OF THE EMBODIMENTS

Glass for Magnetic Recording Medium Substrate

The glass for a magnetic recording medium substrate of the present invention (also referred to as "glass of the present invention", hereinafter) comprises, denoted as molar percentages, 50 to 75 percent of $SiO_2$,
0 to 5 percent of $Al_2O_3$,
0 to 3 percent of $Li_2O$,
0 to 5 percent of $ZnO$,
a total of $Na_2O$ and $K_2O$ of 3 to 15 percent,
a total of MgO, CaO, SrO, and BaO of 14 to 35 percent,
a total of $ZrO_2$, $TiO_2$, $La_2O_3$, $Y_2O_3$, $Yb_2O_3$, $Ta_2O_5$, $Nb_2O_5$, and $HfO_2$ of 2 to 9 percent,
with a molar ratio of {(MgO+CaO)/(MgO+CaO+SrO+BaO)} falling within a range of 0.85 to 1, and a molar ratio of {$Al_2O_3$/(MgO+CaO)} falling within a range of 0 to 0.30.

The glass for a magnetic recording medium substrate of the present invention is classified as oxide glass, and the composition thereof is denoted based on oxides. The term "glass composition based on oxides" is a glass composition that is obtained by conversion to the oxides that are present in the glass when all glass starting materials have been decomposed during melting. The glass of the present invention having the above-stated composition can provide a magnetic recording medium substrate having the three characteristics of high heat resistance, high rigidity, and a high coefficient of thermal expansion. The glass of the present invention is noncrystalline (amorphous) glass. Accordingly, in contrast to crystallized glass, since it is comprised of a homogenous phase, excellent substrate surface flatness can be achieved.

The glass of the present invention will be described in greater detail below. In the following descriptions, unless specifically stated otherwise, the contents, total contents, and ratios of the various components are denoted on a mole basis.

$SiO_2$, a glass network-forming component, has the effects of enhancing glass stability, chemical durability, and, in particular, acid resistance. It also functions to lower the thermal diffusion of the substrate and increase heating efficiency in the course of heating the substrate with radiation as part of the step of forming a magnetic recording layer or the like on the substrate of a magnetic recording medium or when thermoprocessing the film that has been formed in this step. When the $SiO_2$ content is less than 50 percent, the above function is not adequately achieved, and at greater than 75 percent, $SiO_2$ does not fully melt, producing unmelted material in the glass, causing excessive viscosity of the glass during clarification and thus preventing the adequate elimination of bubbles. When a substrate is prepared from glass containing unmelted material, protrusions due to the unmelted material are generated on the surface of the substrate by polishing, precluding use as a magnetic recording medium substrate in which extremely high surface smoothness is required. In addition, when a substrate is prepared from glass containing bubbles, portions of the bubbles appear on the surface of the substrate following polishing. These portions become pits, precluding a smooth main surface on the substrate and thus preventing its use as a magnetic recording medium substrate. On that basis, the $SiO_2$ content falls within a range of 50 to 75 percent. The $SiO_2$ content desirably falls within a range of 57 to 70 percent, preferably 57 to 68 percent, more preferably within a range of 60 to 68 percent, and still more preferably, within a range of 63 to 68 percent.

$Al_2O_3$ is a component that also contributes to the formation of the glass network, and functions to enhance chemical durability and resistance to heat. However, when the content of $Al_2O_3$ exceeds 5 percent, the coefficient of thermal expansion of the glass becomes excessively low, and the difference in the coefficient of thermal expansion of the glass with that of the spindle material constituting the spindle portion of an HDD, such as stainless steel, becomes excessive. Discrepancy develops between the thermal expansion and contraction of the spindle and those of the substrate of the magnetic recording medium with change in the surrounding temperature, resulting in a tendency for the magnetic recording medium to deform. When this tendency develops, the head becomes unable to read information that has been written, thereby compromising recording and reproduction reliability. Accordingly, the $Al_2O_3$ content is specified as 0 to 5 percent. In small quantities, $Al_2O_3$ functions to improve the stability of the glass and lower the liquidus temperature. However, as the content thereof increases, the stability of the glass drops and the liquidus temperature tends to rise. Thus, to further improve the stability of the glass while achieving greater thermal expansion, the upper limit of the $Al_2O_3$ content is desirably 4 percent, preferably 3 percent, more preferably 2.5 percent, still more preferably 1 percent, and yet more preferably, less than 1 percent. Additionally, the lower limit of the $Al_2O_3$ content is desirably 0.1 percent to enhance chemical durability, heat resistance, and glass stability.

$Li_2O$ functions to increase the meltability and moldability of the glass, as well as to raise the coefficient of thermal expansion. When incorporated in small quantities, the glass transition temperature and heat resistance drop sharply. Thus, the $Li_2O$ content is specified as 0 to 3 percent. To further raise the heat resistance, the $Li_2O$ content desirably falls within a range of 0 to 2 percent, preferably within a range of 0 to 1 percent, more preferably within a range of 0 to 0.8 percent, still more preferably within a range of 0 to 0.5 percent, even more preferably within a range of 0 to 0.1 percent, and yet even more preferably, within a range of 0 to 0.08 percent. It is particularly desirable for substantially no $Li_2O$ to be contained. In this context, "substantially not contained" means that no specific component is intentionally added to the glass starting materials, and does not mean that it is eliminated when incorporated as an impurity.

ZnO functions to improve glass meltability, moldability, and stability; increase rigidity; and raise the coefficient of thermal expansion. However, the incorporation of an excessive quantity causes the glass transition temperature to drop considerably, the heat resistance to decrease markedly, and the chemical durability to drop. Accordingly, the ZnO content is specified as 0 to 5 percent. To maintain good heat resistance and chemical durability, the ZnO content desirably falls within a range of 0 to 4 percent, preferably within a range of 0 to 3 percent, more preferably within a range of 0 to 2 percent, still more preferably within a range of 0 to 1 percent, and yet more preferably, within a range of 0 to 0.5 percent. It is possible for substantially no ZnO to be contained.

$Na_2O$ and $K_2O$ are components that function greatly to increase glass meltability and moldability, lower the viscosity of the glass during clarification, promote the elimination of bubbles, and raise the coefficient of thermal expansion. Among the alkali components, they lower the glass transition temperature less than $Li_2O$. In the glass of the present invention, in terms of the homogeneity (state of no unmelted material or residual bubbles) that is demanded of the substrate of a magnetic recording medium and the imparting of a thermal expansion characteristic, the total content of $Na_2O$ and $K_2O$ is specified as equal to or greater than 3 percent. However, when the total content exceeds 15 percent, the glass transition temperature drops and thus heat resistance is lost, as well as chemical durability, particularly acid resistance, drops. There is increased elution of alkali from the substrate surface, the precipitated alkali damages films formed on the substrate, and the like. Thus, the total content of $Na_2O$ and $K_2O$ is specified as 3 to 15 percent. The total content of $Na_2O$ and $K_2O$ desirably falls within a range of 5 to 13 percent, preferably within a range of 8 to 13 percent, and still more preferably, within a range of 8 to 11 percent.

The glass of the present invention can be used as a substrate in a magnetic recording medium without ion exchange, or employed as a substrate in a magnetic recording medium following ion exchange. When ion exchange is conducted, $Na_2O$ is a suitable component for carrying out the ion exchange. When both $Na_2O$ and $K_2O$ are present together as glass components, the combined alkali effect produces an alkali elution-inhibiting effect. However, when both components are incorporated in excessive quantities, the same problems tend to occur as when the total content of the two components is excessive. From this perspective, the total content of $Na_2O$ and $K_2O$ is specified within the above range, with the $Na_2O$ content desirably falling within a range of 0 to 5 percent, preferably 0.1 to 5 percent, more preferably 1 to 5 percent, and still more preferably, 2 to 5 percent. The $K_2O$ content desirably falls within a range of 1 to 10 percent, preferably 1 to 9 percent, more preferably 1 to 8 percent, still more preferably 3 to 8 percent, and yet still more preferably, 5 to 8 percent.

Each of the alkaline earth metals MgO, CaO, SrO, and BaO contributes to enhancing glass meltability, moldability, and stability, and functions to raise the coefficient of thermal expansion. However, when the total content of MgO, CaO, SrO, and BaO is less than 14 percent, the desired effects described above are not achieved. Additionally, when the total content of MgO, CaO, SrO, and BaO exceeds 35 percent, chemical durability diminishes. Accordingly, in the glass of the present invention, the total content of MgO, CaO, SrO, and BaO is specified as 14 to 35 percent. The total content of MgO, CaO, SrO, and BaO desirably falls within a range of 14 to 32 percent, preferably within a range of 14 to 26 percent, more preferably within a range of 15 to 26 percent, and still more preferably, within a range of 17 to 25 percent.

In addition to being lightweight, the presence of high rigidity and hardness that make it possible to withstand the impact when being carried is required in the substrate of a magnetic recording medium employed in mobile applications. Accordingly, the glass that is used to manufacture such a substrate desirably has a high Young's modulus, high specific modulus of elasticity, and low specific gravity. As set forth above, the glass that is employed in the substrate of a magnetic recording medium is required to be of high rigidity in order to withstand high-speed rotation. Of the above alkaline earth metal components, MgO and CaO function both to increase rigidity and hardness, and to increase the specific gravity. Accordingly, they are extremely useful components for obtaining a glass with a high Young's modulus, high specific modulus of elasticity, and low specific gravity. In particular, MgO effectively increases the Young's modulus and lowers the specific gravity, and CaO effectively increases the thermal expansion. Thus, in the glass of the present invention, relative to the total content of MgO, CaO, SrO, and BaO (MgO+CaO+SrO+BaO), the molar ratio of the total content of MgO and CaO ((MgO+CaO)/(MgO+CaO+SrO+BaO)) is specified as falling within a range of 0.85 to 1 from the perspectives of high Young's modulus, high specific modulus of elasticity, and low specific gravity of the glass. When this molar ratio is less than 0.85, there are problems in that the Young's modulus and specific modulus of elasticity drop, the specific gravity rises, and the like. The upper limit of the above molar ratio is a maximum value of 1 when SrO and BaO are not included. The molar ratio ((MgO+CaO)/(MgO+CaO+SrO+BaO)) desirably falls within a range of 0.88 to 1, preferably within a range of 0.89 to 1, more preferably within a range of 0.9 to 1, still more preferably within a range of 0.92 to 1, even more preferably within a range of 0.94 to 1, yet more preferably within a range of 0.96 to 1, yet still more preferably within a range of 0.98 to 1, and yet even more preferably within a range of 0.99 to 1, with 1 being optimal.

From the perspectives of maintaining high Young's modulus, high specific modulus of elasticity, low specific gravity, and good chemical durability, the content of MgO desirably falls within a range of 1 to 23 percent. The lower limit of the MgO content is desirably 2 percent, preferably 5 percent. The upper limit of the MgO content is desirably 15 percent, preferably 8 percent.

From the perspectives of maintaining high Young's modulus, high specific modulus of elasticity, low specific gravity, and good chemical durability, the content of CaO desirably falls within a range of 6 to 21 percent, preferably a range of 10 to 20 percent, more preferably a range of 10 to 18 percent, and still more preferably, within a range of 10 to 15 percent.

From the above perspectives, the total content of MgO and CaO desirably falls within a range of 15 to 35 percent, preferably 15 to 32 percent, more preferably 15 to 30 percent, still more preferably 15 to 25 percent, and yet still more preferably, 15 to 20 percent.

SrO has the above-stated effects, but when incorporated in excessive quantity, causes the specific gravity to increase. The cost of the starting material is also greater than those of MgO and CaO. Thus, the content of SrO desirably falls within a range of 0 to 5 percent, preferably within a range of 0 to 2 percent, more preferably within a range of 0 to 1 percent, and still more preferably, within a range of 0 to 0.5 percent. In terms of achieving the object of the present invention, it is possible not to incorporate SrO as a glass component. That is, the glass of the present invention can contain substantially no SrO.

BaO also has the above-stated effects, but when incorporated in excessive quantity, presents problems in that it causes the Young's modulus to drop, compromises chemical durability, increases the specific gravity, and augments the cost of starting materials. The glass surface of a glass substrate that contains a large quantity of BaO will, with extended use, tend to be altered. This is thought to be because the Ba in the glass reacts with the carbon dioxide in the air, causing $BaCO_3$ to precipitate out onto the substrate surface and adhere. To reduce or prevent the generation of such adhering material, it is desirable not to incorporate an excessive quantity of BaO. From these perspectives, the content of BaO in the glass of the present invention is desirably 0 to 5 percent. The BaO content preferably falls within a range of 0 to 3 percent, preferably within a range of 0 to 2 percent, more preferably within a range of 0 to 1 percent, and still more preferably, within a range of 0 to 0.5 percent. In terms of achieving the object of the present invention, it is possible not to incorporate BaO as a glass component. That is, the glass of the present invention can contain substantially no BaO.

From the above perspectives, the total content of SrO and BaO is desirably 0 to 5 percent, preferably 0 to 3 percent, more preferably 0 to 2 percent, still more preferably 0 to 1 percent, and yet still more preferably, 0 to 0.5 percent.

As set forth above, MgO and CaO have the effects of raising the Young's modulus and coefficient of thermal expansion. By contrast, $Al_2O_3$ functions to raise the Young's modulus slightly and reduce the coefficient of thermal expansion. Accordingly, to obtain a glass with high Young's modulus and high thermal expansion, the molar ratio of $Al_2O_3$ to the total content of MgO and CaO (MgO+CaO), ($Al_2O_3$/(MgO+CaO)), in the glass of the present invention is specified as falling within the range of 0 to 0.30. There is a mutual trade-off between increased heat resistance, higher Young's modulus, and increased thermal expansion in the glass. The preparation of a composition in which the respective contents of $Al_2O_3$, MgO, and CaO are individually established is inadequate to simultaneously achieve these three requirements, and it is important to specify the above molar ratio within a prescribed range. The molar ratio of ($Al_2O_3$/(MgO+CaO)) desirably falls within a range of 0 to 0.1, preferably within a range of 0 to 0.05, and more preferably, within a range of 0 to 0.03.

Among MgO and CaO, CaO is the component that functions to increase thermal expansion the most. When incorporating CaO as an essential component, to further increase thermal expansion, the molar ratio of the $Al_2O_3$ content to the CaO content ($Al_2O_3$/CaO) desirably falls within a range of 0 to 0.4, preferably within a range of 0 to 0.2, and more preferably, within a range of 0 to 0.1.

$ZrO_2$, $TiO_2$, $La_2O_3$, $Y_2O_3$, $Yb_2O_3$, $Ta_2O_5$, $Nb_2O_5$, and $HfO_2$ function to increase chemical durability, particularly alkali resistance, enhance heat resistance by raising the glass transition temperature, and increase rigidity and damage toughness. When the total content of $ZrO_2$, $TiO_2$, $La_2O_3$, $Y_2O_3$, $Yb_2O_3$, $Ta_2O_5$, $Nb_2O_5$, and $HfO_2$ is less than 2 percent, the above effects are not achieved, and when it exceeds 9 percent, there are problems in that glass meltability deteriorates, unmelted material remains in the glass, it becomes difficult to obtain a highly smooth substrate, the specific gravity increases, and the like. Accordingly, the total content of $ZrO_2$, $TiO_2$, $La_2O_3$, $Y_2O_3$, $Yb_2O_3$, $Ta_2O_5$, $Nb_2O_5$, and $HfO_2$ is specified as 2 to 9 percent. The total content of $ZrO_2$, $TiO_2$, $La_2O_3$, $Y_2O_3$, $Yb_2O_3$, $Ta_2O_5$, $Nb_2O_5$, and $HfO_2$ desirably falls within a range of 2 to 8 percent, preferably within a range of 2 to 7 percent, more preferably within a range of 2 to 6 percent, still more preferably within a range of 2 to 5 percent, and yet more preferably, within a range of 3 to 5 percent.

$ZrO_2$ functions greatly to enhance heat resistance by raising the glass transition temperature, and to improve chemical durability, particularly alkali resistance. It also has the effect of increasing the Young's modulus and rigidity. Accordingly, the molar ratio of the $ZrO_2$ content to the total content of $ZrO_2$, $TiO_2$, $La_2O_3$, $Y_2O_3$, $Yb_2O_3$, $Ta_2O_5$, $Nb_2O_5$, and $HfO_2$ ($ZrO_2+TiO_2+La_2O_3+Y_2O_3+Yb_2O_3+Ta_2O_5+Nb_2O_5+HfO_2$), ($ZrO_2/(ZrO_2+TiO_2+La_2O_3+Y_2O_3+Yb_2O_3+Ta_2O_5+Nb_2O_5+HfO_2$)), is desirably 0.3 to 1, preferably 0.4 to 1, more preferably 0.5 to 1, still more preferably 0.7 to 1, yet more preferably 0.8 to 1, even more preferably 0.9 to 1, and yet still more preferably, 0.95 to 1, with 1 being particularly desirable. The content of $ZrO_2$ desirably falls within a range of 2 to 9 percent, preferably within a range of 2 to 8 percent, more preferably within a range of 2 to 7 percent, still more preferably within a range of 2 to 6 percent, yet more preferably within a range of 2 to 5 percent, and yet still more preferably, within a range of 3 to 5 percent.

Among the above components, $TiO_2$ functions well to inhibit an increase in specific gravity as well as to raise the Young's modulus and specific modulus of elasticity. However, the incorporation of an excessive quantity causes reaction products with water to adhere to the glass surface when the glass is immersed in water, thereby reducing water resistance. Thus, the $TiO_2$ content desirably falls within a range of 0 to 5 percent. In terms of maintaining good water resistance, the content of $TiO_2$ desirably falls within a range of 0 to 4 percent, preferably within a range of 0 to 3 percent, more preferably within a range of 0 to 2 percent, still more preferably within a range of 0 to 1 percent, and yet still more preferably, within a range of 0 to 0.5 percent. In terms of further enhancing water resistance, it is desirable for substantially no $TiO_2$ to be incorporated.

Since $La_2O_3$, $Y_2O_3$, $Yb_2O_3$, $Ta_2O_5$, $Nb_2O_5$, and $HfO_2$ have a considerable ability to increase the specific gravity, from the perspective of inhibiting an increase in specific gravity, the content of each of these components desirably falls within a range of 0 to 4 percent, preferably within a range of 0 to 3 percent, preferably falls within a range of 0 to 2 percent, more preferably falls within a range of 0 to 1 percent, and still more preferably falls within a range of 0 to 0.5 percent. It is also possible not to incorporate $La_2O_3$, $Y_2O_3$, $Yb_2O_3$, $Ta_2O_5$, $Nb_2O_5$, and $HfO_2$ as glass components.

Additionally, $B_2O_3$, $P_2O_5$, and the like can be incorporated as glass components.

$B_2O_3$ functions to decrease brittleness and increase meltability. However, the incorporation of an excessive quantity compromises chemical durability. Thus, the content thereof desirably falls within a range of 0 to 3 percent, preferably within a range of 0 to 1 percent, and more preferably within a range of 0 to 0.5 percent, with no incorporation being optimal.

$P_2O_5$ can be incorporated in small quantities within a range that does not compromise the object of the present invention. However, the incorporation of an excessive quantity reduces chemical durability. Thus, the content thereof is desirably 0 to 1 percent, preferably 0 to 0.5 percent, and more preferably 0 to 0.3 percent, with no incorporation being optimal.

To obtain a glass that simultaneously satisfies the three characteristics of high heat resistance, high Young's modulus, and high coefficient of thermal expansion, the total contents of $SiO_2$, $Al_2O_3$, $Na_2O$, $K_2O$, MgO, CaO, $ZrO_2$, $TiO_2$, $La_2O_3$, $Y_2O_3$, $Yb_2O_3$, $Ta_2O_5$, $Nb_2O_5$, and $HfO_2$ desirably constitute equal to or more than 95 percent, preferably constitute equal to or more than 97 percent, more preferably constitute equal to or more than 98 percent, still more preferably constitute equal to or more than 99 percent, and may constitute 100 percent.

Further, in terms of inhibiting an increase in specific gravity, the total contents of $SiO_2$, $Al_2O_3$, $Na_2O$, $K_2O$, MgO, CaO, $ZrO_2$, and $TiO_2$ desirably constitute equal to or more than 95 percent, preferably constitute equal to or more than 97 percent, more preferably constitute equal to or more than 98 percent, still more preferably constitute equal to or more than 99 percent, and may constitute 100 percent.

Optional components in the form of Sn oxide and Ce oxide will be described next.

Sn oxide and Ce oxide are components that can function as clarifying agents. Sn oxide releases oxygen gas at high temperature during melting of the glass, takes in minute bubbles contained in the glass and converts them to large bubbles so that they tend to rise, thereby functioning well to promote clarification. Additionally, Ce oxide incorporates as a glass component oxygen that is present as a gas in the glass at low temperature, thereby functioning well to eliminate bubbles. When the size of the bubbles (the size of the bubbles (voids) remaining in the glass upon solidification) falls within the range of equal to or lower than 0.3 mm, the action of Sn oxide in eliminating both relatively large and extremely small bubbles is strong. When Ce oxide is added with Sn oxide, the density of bubbles from about 50 μm to 0.3 mm in size is greatly reduced to about one part in several tens of parts. Causing both Sn oxide and Ce oxide to be present together in this manner can increase the clarifying effect on the glass over a wide temperature range running from the high temperature region to the low temperature region. Thus, it is desirable to add Sn oxide and Ce oxide.

When the total quantity of Sn oxide and Ce oxide that is added relative to the total of the other components is equal to or greater than 0.02 mass percent, an adequate clarifying effect can be anticipated. When a substrate is prepared using glass containing even trace or small quantities of unmelted material, and the unmelted material appears on the surface of the substrate due to polishing, protrusions are generated on the substrate surface and portions where the unreacted material drops out become pits. The smoothness of the substrate surface is lost, and the substrate cannot be used in a magnetic recording medium. By contrast, when the total quantity of Sn oxide and Ce oxide added relative to the total of the other components is equal to or less than 3.5 mass percent, they can dissolve adequately into the glass and prevent the incorporation of unmelted material.

When preparing crystallized glass, Sn and Ce function to produce crystal nuclei. Since the glass of the present invention is amorphous glass, it is desirable not to cause crystals to precipitate by heating. When the quantities of Sn and Ce are excessive, such precipitation of crystals tends to occur. Thus, the addition of an excessive quantity of Sn oxide or Ce oxide is to be avoided.

From the above perspectives, the total quantity of Sn oxide and Ce oxide added relative to the total of the other components is desirably 0.02 to 3.5 mass percent. The total quantity of Sn oxide and Ce oxide added relative to the total of the other components preferably falls within a range of 0.1 to 2.5 mass percent, more preferably a range of 0.1 to 1.5 mass percent, and still more preferably, within a range of 0.5 to 1.5 mass percent.

The use of $SnO_2$ as the Sn oxide is desirable to effectively release oxygen gas from the glass melt at high temperature.

Sulfates can also be added as clarifying agents in a range of 0 to 1 mass percent relative to the total of the other components. However, there is a risk of melted material in the glass melt being blown off. Since foreign material increases markedly in the glass, it is desirable not to incorporate sulfates.

Pb, Cd, As, and the like are substances that negatively affect the environment, their incorporation is desirably avoided.

From the above perspectives, the glass of the present invention desirably comprises:

50 to 75 percent of $SiO_2$, 0 to 3 percent of $B_2O_3$, 0 to 5 percent of $Al_2O_3$, 0 to 3 percent of $Li_2O$, 0 to 5 percent of $Na_2O$, 1 to 10 percent of $K_2O$, 1 to 23 percent of MgO, 6 to 21 percent of CaO, 0 to 5 percent of BaO, 0 to 5 percent of ZnO, 0 to 5 percent of $TiO_2$, and 2 to 9 percent of $ZrO_2$, and preferably comprises:

50 to 75 percent of $SiO_2$, 0 to 1 percent of $B_2O_3$, 0 to 5 percent of $Al_2O_3$, 0 to 3 percent of $Li_2O$, 0 to 5 percent of $Na_2O$, 1 to 9 percent of $K_2O$, 2 to 23 percent of MgO, 6 to 21 percent of CaO, 0 to 3 percent of BaO, 0 to 5 percent of ZnO, 0 to 3 percent of $TiO_2$, and 3 to 7 percent of $ZrO_2$.

The glass for a magnetic recording medium substrate of the present invention can be prepared by weighing out and dispensing glass starting materials such as oxides, carbonates, nitrates, sulfates, and hydroxides to achieve the desired glass composition; thoroughly stirring the mixture; heating and melting the mixture within a range of 1,400 to 1,600° C., for example, in a melting vessel; clarifying and stirring the melt to adequately remove bubbles; and molding the homogenized glass melt. The above-described clarifying agents can be added to the glass starting materials as needed.

The glass of the present invention of the above-described composition can simultaneously achieve high heat resistance, high rigidity, and high coefficient of thermal expansion. Desirable physical properties of the glass of the present invention will be sequentially described below.

1. Coefficient of Thermal Expansion

As set forth above, when there is a large difference in coefficient of thermal expansion between the glass constituting the substrate of a magnetic recording medium and the spindle material (such as stainless steel) of an HDD, changes in temperature during the operation of the HDD cause the magnetic recording medium to deform, problems occur in recording and reproduction, and reliability ends up being compromised. In particular, in magnetic recording media having a magnetic recording layer comprised of a magnetic material of high Ku, the recording density is extremely high. Thus, even slight deformation of the magnetic recording medium tends to cause these problems. Generally, the spindle material of an HDD material has an average linear coefficient of expansion (coefficient of thermal expansion) of equal to or greater than $70 \times 10^{-7}/°$ C. over a temperature range of 100 to 300° C. The glass for a magnetic recording medium substrate of the present invention can be used to provide a substrate that is suited to a magnetic recording medium having a magnetic recording layer comprised of a magnetic material of high Ku with an average linear coefficient of expansion of equal to or greater than $70 \times 10^{-7}/°$ C. over a temperature range of 100 to 300° C. and thus enhance reliability. The average linear coefficient of expansion desirably falls within a range of equal to or greater than $72 \times 10^{-7}/°$ C., preferably within a range of equal to or greater than $74 \times 10^{-7}/°$ C., more preferably within a range of equal to or greater than $75 \times 10^{-7}/°$ C., still more preferably within a range of equal to or greater than $77 \times 10^{-7}/°$ C., even more preferably within a range of equal to or greater than $78 \times 10^{-7}/°$ C., and yet even more preferably, within a range of equal to or greater than $79 \times 10^{-7}/°$ C. Taking into account the thermal expansion characteristics of the spindle material, the upper limit of the average linear coefficient of expansion is, for example, desirably about $120 \times 10^{-7}/°$ C., preferably $100 \times 10^{-7}/°$ C., and more preferably, $88 \times 10^{-7}/°$ C.

2. Glass Transition Temperature

When attempting to increase the recording density of a magnetic recording medium by incorporating a magnetic material of high Ku or the like as set forth above, the substrate of the magnetic recording medium is exposed to high temperatures during high temperature processing of the magnetic material. In this process, to prevent loss of the extremely high degree of flatness of the substrate, good heat resistance is demanded of the glass for a magnetic recording medium substrate. The glass transition temperature can be employed as an index of heat resistance. The glass for a magnetic recording medium substrate of the present invention permits a glass transition temperature of equal to or higher than 630° C., making it possible to maintain good flatness following high temperature processing. Accordingly, the glass of the present invention can provide a substrate that is suited to the preparation of a magnetic recording medium comprising a magnetic material of high Ku.

The glass transition temperature desirably falls within a range of equal to or higher than 640° C., preferably within a range of equal to or higher than 650° C., more preferably within a range of equal to or higher than 655° C., still more preferably within a range of equal to or higher than 660° C., yet still more preferably within a range of equal to or higher than 670° C., even still more preferably within a range of equal to or higher than 675° C., and even yet still more preferably, within a range of equal to or higher than 680° C. Further desirable ranges of the lower limit, in sequentially increasing order, are equal to or higher than 685° C., equal to or higher than 690° C., equal to or higher than 695° C., equal to or higher than 700° C., equal to or higher than 705° C., and equal to or higher than 710° C. The upper limit of the glass transition temperature is, for example, about 750° C., but is not specifically limited.

3. Young's Modulus

Deformation of a magnetic recording medium includes deformation due to high speed rotation in addition to deformation due to change in the temperature of an HDD. To inhibit deformation during high speed rotation, it is desirable to increase the Young's modulus of the glass for a magnetic recording medium substrate. The glass for a magnetic recording medium substrate of the present invention permits raising the Young's modulus to equal to or higher than 80 GPa, thereby inhibiting deformation in the substrate during high speed rotation and permitting the accurate reading and writing of data even on a magnetic recording medium of increased recording density comprising a magnetic material of high Ku.

The Young's modulus desirably falls with a range of equal to or higher than 81 GPa, preferably within a range of equal to or higher than 82 GPa. The upper limit of the Young's modulus can be, for example, about 95 GPa, but is not specifically limited.

The above coefficient of thermal expansion, glass transition temperature, and Young's modulus of the glass for a magnetic recording medium substrate are all important characteristics that are required of the glass substrate employed in a magnetic recording medium of increased recording density comprising a magnetic material of high Ku. Accordingly, in terms of providing a substrate suited to the above magnetic recording medium, a glass for a magnetic recording medium substrate integrally having all of the characteristics of an average linear coefficient of expansion at 100 to 300° C. of equal to or greater than $70 \times 10^{-7}$/° C., a glass transition temperature of equal to or higher than 630° C., and a Young's modulus of equal to or higher than 80 GPa is particularly desirable. The present invention can provide a glass for a magnetic recording medium substrate that integrally has all of the above characteristics.

4. Specific Modulus of Elasticity and Specific Gravity

To provide a substrate that resists deformation when the magnetic recording medium is rotating at high speed, the specific modulus of elasticity of the glass for a magnetic recording medium substrate is desirably equal to or higher than 30 MNm/kg. The upper limit is, for example, about 35 MNm/kg, but is not specifically limited. The specific modulus of elasticity is obtained by dividing the Young's modulus of the glass by its density. In this context, the density can be thought of as a quantity obtained by expressing the specific gravity of the glass in units of $g/cm^3$. Achieving a glass of low specific gravity makes it possible to lighten the substrate in addition to increasing the specific modulus of elasticity. Lightening the substrate can reduce the weight of the magnetic recording medium, thus reduce the electric power required to rotate the magnetic recording medium, and inhibit power consumption by an HDD. The specific gravity of the glass for a magnetic recording medium substrate desirably falls within a range of less than 3.0, preferably within a range of equal to or lower than 2.9, and more preferably, with a range of equal to or lower than 2.85.

5. Acid Resistance

In the course of producing the substrate of a magnetic recording medium, the glass is processed into a disk shape and the main surface is processed to be extremely flat and smooth. Following these processing steps, normally, the substrate is cleaned with an acid to remove grime in the form of organic material that has adhered to the surface. In that case, when the glass constituting the substrate has poor acid resistance, the cleaning with an acid roughens the surface, flatness and smoothness are lost, and the substrate cannot be readily used in a magnetic recording medium. In a glass for a magnetic recording medium substrate for high-density recording having a magnetic recording layer comprised of a magnetic material of high Ku in which high flatness and smoothness of the substrate surface are required, good acid resistance is particularly desirable. The glass of the present invention can achieve an acid resistance in the form of an etching rate of equal to or less than 0.09 µm/minute when immersed in 1.7 mass percent hydrofluosilicic acid aqueous solution maintained at 45° C. A substrate that is rendered even cleaner by removing foreign matter such as abrasive that has adhered to the surface can be obtained by cleaning with an alkali following cleaning with an acid. To prevent a decrease in flatness and smoothness of the surface of the substrate due to roughening during cleaning with an alkali, the glass constituting the substrate desirably has good alkali resistance. Alkali resistance can be achieved in the form of an etching rate of equal to or less than 0.09 nm/minute when immersed in a 1 mass percent potassium hydroxide aqueous solution maintained at 50° C. The acid resistance and alkali resistance as evaluated by the above etching rates will be described below.

The test of immersing the glass in a 1.7 mass percent hydrofluosilicic acid aqueous solution maintained at 45° C. corresponds to the environment to which the glass is exposed during acid cleaning, or an environment that is similar thereto. When the etching rate under these conditions exceeds 0.09 µm/minute, the flat, smooth substrate surface ends up being roughened by the acid cleaning, creating the risk of losing the flatness and smoothness of the substrate surface. Thus, imparting the above acid resistance to the glass for a magnetic recording medium substrate makes it possible to provide a substrate in which flatness and smoothness are diminished extremely little by the acid cleaning. The acid resistance of the glass for a magnetic recording medium substrate preferably falls within a range of an etching rate of equal to or less than 0.07 µm/minute, more preferably within a range of equal to or less than 0.06 µm/minute, and still more preferably, within a range of equal to or less than 0.05 µm/minute.

The etching rate denotes the depth of the glass surface that is removed per unit time. It can be calculated as the amount of etching per unit time by using the specific gravity to convert the rate of weight reduction of a sample when immersed in the above hydrofluosilicic acid aqueous solution to a rate of volumetric reduction and dividing it by the surface area of the glass.

Further, the test of immersing the glass in a 1 mass percent potassium hydroxide aqueous solution maintained at 50° C. corresponds to the environment to which the glass is exposed during alkali cleaning, or an environment that is similar thereto. A glass with an etching rate of equal to or less than 0.09 nm/minute under these conditions makes it possible to provide a substrate in which flatness and smoothness are diminished extremely little by the alkali cleaning The alkali resistance of the glass for a magnetic recording medium substrate desirably falls within a range of an etching rate of equal to or less than 0.08 nm/minute. The same method that is used to measure the etching rate for acid resistance set forth above can be used to measure this etching rate.

6. Liquidus Temperature

In the course of melting glass and molding the glass melt obtained, the glass crystallizes and a homogenous glass cannot be produced when the molding temperature is lower than the liquidus temperature. Thus, the glass molding temperature must be greater than or equal to the liquidus temperature. However, when the molding temperature exceeds 1,300° C., for example, the pressing mold employed in the course of press molding a glass melt reacts with the hot glass and tends to be damaged. Even when conducting molding by casting a glass melt into a casting mold, the casting mold tends to be similarly damaged. Further, there is a risk that the clarifying effects of Sn oxide and Ce oxide will decrease as the clarifying temperature increases with the molding temperature. Taking these points into account, the liquidus temperature is desirably equal to or lower than 1,300° C. The liquidus temperature preferably falls within a range of equal to or lower than 1,250° C., more preferably a range of equal to or lower than 1,200° C. The glass of the present invention makes it possible to achieve a liquidus temperature falling within the above desirable range. The lower limit is not specifically limited, but a temperature of equal to or higher than 800° C. can be thought of as a yardstick.

7. Spectral Transmittance

A magnetic recording medium is produced by a process of forming a multilayered film comprising a magnetic recording layer on a glass substrate. In the course of forming a multilayered film on a substrate by the single substrate film forming method that is currently the mainstream, for example, the substrate is first introduced into the substrate heating region of a film-forming device and heated to a temperature at which film formation by sputtering or the like is possible. Once the temperature of the substrate has risen adequately, the substrate is moved to a first film-forming region where a film corresponding to the lowest layer of the multilayer film is formed on the substrate. Next, the substrate is moved to a second film-forming region where a film is formed over the lowermost layer. The multilayered film is thus formed by sequentially moving the substrate to subsequent film-forming regions and forming films. Since the heating and film formation are conducted under reduced pressure achieved by evacuation with a vacuum pump, heating of the substrate must be conducted by a non-contact method. Thus, the substrate is suitably heated by radiation. This film formation must be conducted while the substrate is not at a temperature that is lower than the temperature suited to film formation. When the time required for forming each layer of the film is excessively long, the temperature of the substrate that has been heated drops, and there is a problem in that it is impossible to achieve an adequate substrate temperature in subsequent film-forming regions. To maintain the substrate at a temperature permitting film formation for an extended period, heating the substrate to a higher temperature is conceivable. However, when the heating rate of the substrate is low, the heating period must be extended, and the time during which the substrate remains in the heating region must be increased. Thus, the residence time of the substrate in each film-forming region increases, and an adequate substrate temperature ends up not being maintained in subsequent film-forming regions. Further, it becomes difficult to increase throughput. In particular, when producing a magnetic recording medium comprising a magnetic recording layer comprised of a magnetic material of high Ku, it is desirable to further increase the efficiency of heating the substrate with radiation so as to heat the substrate to a high temperature within a prescribed period.

In glasses containing $SiO_2$ and $Al_2O_3$, absorption peaks are present in the region containing the wavelengths of 2,750 to 3,700 nm. The absorption of radiation at short wavelengths can be increased by adding an infrared-absorbing agent, described further below, or by incorporating it as a glass component, thereby imparting absorption in the wavelength range of wavelengths of 700 to 3,700 nm. The use of infrared radiation having a spectral maximum in the above wavelength range is desirable to efficiently heat the glass substrate with radiation, that is, by irradiation with infrared radiation. It is conceivable to increase the power of the infrared radiation while matching the maximum spectral wavelength of the infrared radiation with the peak absorption wavelength of the substrate. Taking the example of a high-temperature carbon heater as an infrared source, it suffices to increase the input to the carbon heater to increase the power of the infrared radiation. However, considering the radiation from the carbon heater as black body radiation, an increase in the input increases the heater temperature. This shifts the maximum wavelength of the infrared radiation spectrum to the short wavelength side, ending up outside the absorption wavelength region of the glass. Thus, the powder consumption of the heater must be made excessively high to increase the heating rate of the substrate, creating a problem by shortening the service lifetime of the heater or the like.

In light of such problems, increasing the absorption of the glass in the above wavelength region (wavelengths 700 to 3,700 nm), irradiating infrared radiation with the maximum spectral wavelength of the infrared radiation in a state of proximity to the peak absorption wavelength of the substrate, and not employing an excessive heater input are desirable. Accordingly, to increase the infrared radiation heating efficiency, either the presence of a region in which the spectral transmittance as converted to a thickness of 2 mm is equal to or less than 50 percent in the 700 to 3,700 nm wavelength region in the glass for a magnetic recording medium substrate, or a glass with transmittance characteristics such that the spectral transmission as converted to a thickness of 2 mm is equal to or less than 70 percent over the above wavelength region is desirable. For example, the oxide of at least one metal selected from the group consisting of iron, copper, cobalt, ytterbium, manganese, neodymium, praseodymium, niobium, cerium, vanadium, chromium, nickel, molybdenum, holmium, and erbium can function as an infrared-absorbing agent. Further, water or OH groups contained in water absorb strongly in the 3 μm band, so water can also function as an infrared-absorbing agent. Incorporating a suitable quantity of a component that is capable of functioning as the above infrared-absorbing agent into the glass of the present invention can impart the above desirable absorption characteristic to the glass of the present invention. The quantity added of the oxide that is capable of functioning as the infrared-absorbing agent is desirably 500 ppm to 5 percent, preferably 2,000 ppm to 5 percent, more preferably 2000 ppm to 2 percent, and still more preferably, falls within a range of 4,000 ppm to 2 percent based on the mass as the oxide. For water, the incorporation of more than 200 ppm is desirable, and the incorporation of equal to or more than 220 ppm is preferred, based on weight as converted to $H_2O$.

When employing $Yb_2O_3$ and $Nb_2O_5$ as glass components, and when adding Ce oxide as a clarifying agent, infrared absorption by these components can be used to enhance substrate heating efficiency.

[Magnetic Recording Medium Substrate and Method of Manufacturing the Same]

The magnetic recording medium substrate of the present invention is comprised of the glass for a magnetic recording medium substrate of the present invention. The glass for a magnetic recording medium substrate of the present invention makes it possible to achieve a glass substrate that has all of the three characteristics of high heat resistance, high rigidity, and high coefficient of thermal expansion.

The present invention further relates to a method of manufacturing a magnetic recording medium substrate by preparing a glass melt by heating glass starting materials; using a method of press molding, down draw, or floating to mold the glass melt into a plate shape; and employing a step of processing the plate-shaped glass obtained to produce the magnetic recording medium substrate of the present invention.

In the press molding method, an outflowing glass melt is cut to obtain a desired glass melt gob. The glass gob is then press molded with a pressing mold to prepare a thin disk-shaped substrate blank.

In the down draw method, a gutter-shaped molded member is employed to guide the glass melt, the glass melt is caused to overflow to the two sides of the molded member, two streams of glass melt flowing downward along the molded member are caused to flow together beneath the molded member and then drawn downward and molded into a sheet form. This method is also referred to as the fusion method. The surfaces of the glass that has contacted the molded member are laminated together to obtain sheet glass without contact traces. Subsequently, thin disk-shaped substrate blanks are cut out of the sheet material obtained.

In the floating method, a glass melt is caused to flow out onto a float bath of accumulated molten tin or the like, and molded into sheet glass while being drawn. Subsequently, thin disk-shaped substrate blanks are cut out of the sheet material obtained.

A center hole is provided in the substrate blank thus obtained, the inner and outer circumferences thereof are processed, and the two main surfaces thereof are lapped and polished. Next, a cleaning step comprising acid cleaning and alkali cleaning is conducted to obtain a disk-shaped substrate.

In the present invention, the term "main surface" means the surface of a substrate on which a magnetic recording layer is to be provided or has been provided. Since such surfaces are those with the largest area among the surfaces of the substrate of a magnetic recording medium, they are called main surfaces. In the case of a disk-shaped magnetic recording medium, they correspond to the surface of the circular shape of the disk (excluding the center hole when present).

One embodiment of the substrate of a magnetic recording medium of the present invention is a magnetic recording medium substrate having an ion-exchange layer over a part or all of the surface thereof. The ion-exchange layer can be formed by bringing an alkali salt into contact with the substrate surface at high temperature and causing the alkali metal ions in the alkali salt to exchange with the alkali metal ions in the substrate. Normal ion exchange is conducted by heating an alkali nitrate to obtain molten salt and immersing the substrate in the molten salt. For example, the magnetic recording medium substrate is immersed in a molten salt in the form of potassium nitrate to cause the Na ions in the substrate to exchange with the K ions in the molten salt, forming an ion-exchange layer on the surface of the substrate. Ion exchange can reduce the quantity of alkali eluting out of the substrate surface. When alkali metal ions with a large ion radius are introduced in place of alkali metal ions with a small ion radius in the substrate, a compressive stress layer is formed in the surface of the substrate. This layer can chemically strengthen the substrate.

To obtain a magnetic recording medium substrate having the above ion-exchange layer, the alkali metal ions that exchange by ion exchange with the alkali metal ions contained as glass components in the glass of the present invention are desirably K, Rb, or Cs ions alone; a combination of K ions and Rb ions; a combination of K ions and Cs ions; a combination of Rb ions and Cs ions; or a combination of K ions, Rb ions, and Cs ions. In the case of chemical strengthening, the ion exchange is desirably conducted within a temperature range above the distortion point and below the glass transition temperature of the glass constituting the substrate, in which the molten alkali salt does not thermally decompose. When subjecting a substrate comprised of a glass containing a glass component in the form of $Li_2O$ to ion exchange, molten salt in the form of sodium nitrate can be employed.

The presence of an ion-exchange layer on the substrate can be confirmed by observing the glass cross-section (a plane passing through the ion-exchange layer) by Babinet's method, the method of measuring the concentration distribution of alkali metal ions from the surface of the glass in the direction of depth, and the like.

Deflecting strength is commonly employed as an index of the impact resistance of the substrate of a magnetic recording medium. As shown in FIG. 1, the deflecting strength can be determined by placing a steel ball in the center hole of a substrate positioned on a holder, applying a load with a load cell, and taking the load value when the substrate is broken down. The measurement can be conducted with a deflecting strength measuring and testing device (Shimadzu Autograph DDS-2000), for example. The glass of the present invention can provide a glass substrate having a deflecting strength of, for example, equal to or greater than 10 kg, desirably equal to or greater than 15 kg, and preferably, equal to or greater than 20 kg.

The substrate of the present invention is, for example, equal to or less than 1.5 mm in thickness, desirably equal to or less than 1.2 mm in thickness, and preferably, equal to or less than 1 mm in thickness. The lower limit is desirably 0.3 mm.

The magnetic recording medium substrate of the present invention is desirably disk-shaped. The main surface thereof desirably has surface properties (1) to (3) below:

(1) an arithmetic average surface roughness Ra measured over an area of 1 μm×1 μm by an atomic force microscope of equal to or lower than 0.25 nm;

(2) an arithmetic average surface roughness Ra measured over an area of 5 μm×5 μm of equal to or lower than 0.15 nm;

(3) an arithmetic average surface waviness Wa at a wavelength of 100 μm to 950 μm of equal to or lower than 0.5 nm.

The grain size of the magnetic recording layer that is formed on the substrate is, for example, less than 10 nm in a vertical recording method. To increase the recording density, even when a minute bit size is employed, no improvement in magnetic characteristics can be anticipated when the surface roughness of the substrate is high. By contrast, a substrate in which the arithmetic averages Ra of the two types of surface roughens of (1) and (2) above fall within the above-stated ranges permits improvement in magnetic characteristics even when a minute bit size is employed to achieve a high recording density. Keeping the arithmetic average of surface waviness Wa of (3) above within the stated range permits enhancement of the floating stability of the magnetic head in an HDD. The above-described acid resistance and alkali resistance of the glass of the present invention are effective for achieving a substrate having surface properties (1) to (3) described above.

[Magnetic Recording Medium]

The magnetic recording medium of the present invention comprises a magnetic recording layer on the substrate of the present invention.

The magnetic recording medium is called a magnetic disk, hard disk, or the like. It is suited to use in an internal memory device (fixed disk or the like) such as a desktop computer, server-use computer, laptop computer, or mobile computer; internal memory device such as a portable recording and reproduction device that records and reproduces images and/or sound; vehicle-mounted audio recording and reproduction devices; and the like.

For example, the magnetic recording medium is sequentially comprised of, moving outward from the main surface, at least an adhesive layer, an undercoat layer, a magnetic layer (magnetic recording layer), a protective layer, and a lubricating layer laminated on the main surface of a substrate.

For example, the substrate is introduced into a film-forming device within which a vacuum has been drawn, and the adhesive layer through the magnetic layer are sequentially formed on the main surface of the substrate in an Ar atmosphere by the DC magnetron sputtering method. The adhesive layer may be in the form of, for example, CrTi, and the undercoat layer may be in the form of, for example, CrRu. Following the forming of these films, the protective layer may be formed using $C_2H_4$ by the CVD method, for example. Within the same chamber, nitriding can be conducted to incorporate nitrogen into the surface to form a magnetic recording medium. Subsequently, for example, PFPE (polyfluoropolyether) can be coated over the protective layer by the dip coating method to form a lubricating layer.

As set forth above, to achieve higher density recording on a magnetic recording medium, the magnetic recording layer is desirably formed of a magnetic material of high Ku. Examples of magnetic materials that are desirable from this perspective are Fe—Pt-based magnetic materials and Co—Pt-based magnetic materials. In this context, the term "based" means containing That is, in the magnetic recording medium of the present invention, a magnetic recording layer in the form of a magnetic recording layer containing Fe and Pt, or Co and Pt, is desirable. For example, the film-forming temperature of magnetic materials that have conventionally been widely employed, such as Co—Cr-based materials, is about 250 to 300° C. By contrast, the film-forming temperature of Fe—Pt-based magnetic materials and Co—Pt-based magnetic materials is normally a high temperature exceeding 500° C. Further, to impart a crystalline orientation to these magnetic films following film formation, they are normally subjected to a high-temperature heat treatment (annealing) at a temperature exceeding the film-forming temperature. Accordingly, when using Fe—Pt-based magnetic materials or Co—Pt-based magnetic materials to form a magnetic recording layer, the substrate is exposed to this high temperature. In that case, when the glass constituting the substrate has poor heat resistance, it deforms at the high temperature and flatness is lost. By contrast, the substrate that is contained in the magnetic recording medium of the present invention is comprised of the glass of the present invention and can exhibit good heat resistance. Thus, even following the formation of a magnetic recording layer using an Fe—Pt-based magnetic material or a Co—Pt-based magnetic material, a high degree of flatness can be retained. The magnetic recording layer can be formed, for example, by forming a film of Fe—Pt-based magnetic material or Co—Pt-based magnetic material by DC magnetron sputtering in an Ar atmosphere and then conducting thermoprocessing at higher temperature in a heating furnace.

The Ku (crystal magnetic anisotropy energy constant) is proportional to the coercivity Hc. "Coercivity Hc" denotes the strength of the magnetic field that reverses the magnetization. As set forth above, magnetic materials of high Ku have resistance to thermal fluctuation. Thus, they are known to be materials in which magnetized regions tend not to deteriorate due to thermal fluctuation, even when extremely minute magnetic particles are employed, and are thus suited to high-density recording. However, since Ku and Hc are proportional, as stated above, the higher the Ku, the higher the Hc. That is, the reversal of magnetization by the magnetic head tends not to occur and the writing of information becomes difficult. Accordingly, the recording method of assisting the reversal of magnetization of a magnetic material of high Ku by instantaneously applying energy to the data writing region through the head to lower the coercivity when writing information with a magnetic head has gathered attention in recent years. Such recording methods are referred to as "energy-assisted recording methods." Among them, the recording method of assisting the reversal of magnetization by irradiating a laser beam is referred to as the "heat-assisted recording method," and the recording method that provides assistance by means of microwaves is referred to as the "microwave-assisted recording method". As set forth above, the present invention permits the formation of a magnetic recording layer with a magnetic material of high Ku. Thus, by combining a magnetic material of high Ku with energy-assisted recording, for example, it is possible to achieve high-density recording in which the surface recording density exceeds one terabyte/inch. Heat-assisted recording methods are described in detail, for example, in IEEE Transactions on Magnetics, Vol. 44, No. 1, January 2008 119, which is expressly incorporated herein by reference in its entirety, and microwave-assisted recording methods are described in detail in, for example, IEEE Transactions on Magnetics, Vol. 44, No. 1, January 2008 125, which is expressly incorporated herein by reference in its entirety. Energy-assisted recording can also be conducted in the present invention by the methods described in these documents.

The dimensions of the magnetic recording medium substrate (for example, a magnetic disk substrate) and those of the magnetic recording medium (for example, a magnetic disk) of the present invention are not specifically limited. Because they are capable of high-density recording, the medium and substrate can be miniaturized. For example, they are suitable as magnetic disk substrates and magnetic disks with nominal diameters of 2.5 inches and even smaller (such as one inch).

EXAMPLES

The present invention is described in greater detail below through Examples. However, the present invention is not limited to the embodiments shown in Examples.

(1) Preparation of Glass Melts

Starting materials such as oxides, carbonates, nitrates, and hydroxides were weighed out and mixed to obtain blended starting materials in a manner calculated to yield glasses of the compositions shown in Table 1. Each of the starting materials was charged to a melting vessel and heated, melted, clarified, and stirred for six hours within a range of 1,400 to 1,600° C. to prepare a homogenous glass melt containing no bubbles or unmelted matter. No bubbles, unmelted material, crystal precipitation, or contaminants in the form of flame-resistant material or platinum constituting the melting vessel were found in the glasses obtained.

(2) Preparation of Substrate Blanks

Next, disk-shaped substrate blanks were prepared by methods A and B below.

(Method A)

The above glass melt that had been clarified and homogenized was caused to flow out of a pipe at a constant flow rate and received in the lower mold of a pressing mold. The outflowing glass melt was cut with a cutting blade to obtain a glass melt gob of prescribed weight on the lower mold. The lower mold carrying the glass melt gob was then immediately removed from beneath the pipe. Using an upper mold facing the lower mold and a sleeve mold, the glass melt was press molded into a thin disk shape measuring 66 mm in diameter and 2 mm in thickness. The press-molded article was cooled to a temperature at which it would not deform, removed from the mold, and annealed, yielding a substrate blank. In the molding, multiple lower molds were used and the outflowing glass melt was continuously molded into disk-shaped substrate blanks.

(Method B)

The glass melt that had been clarified and homogenized was continuously cast from above into the through-holes of a heat-resistant casting mold provided with round through-holes, molded into round rods, and brought out from beneath the through holes. The glass that was brought out was annealed. The glass was then sliced at constant intervals in a direction perpendicular to the axis of the round rods using a multiwire saw to prepare disk-shaped substrate blanks.

Methods A and B were employed in the present Examples. However, methods C and D, described below, are also suitable as methods for manufacturing disk-shaped substrate blanks.

(Method C)

The above glass melt was caused to flow out onto a float bath, molded into sheet glass (molded by the floating method), and then annealed. Disk-shaped pieces of glass were then cut from the sheet glass to obtain substrate blanks.

(Method D)

The above glass melt was molded into sheet glass by the overflow down draw method (fusion method) and annealed. Disk-shaped pieces of glass were then cut from the sheet glass to obtain substrate blanks.

(3) Preparation of Substrates

Through-holes were formed in the center of substrate blanks obtained by the various above methods. The inner and outer circumferences thereof were ground and the main surfaces of the disks were lapped and polished (polished to mirror surfaces) to finish them into magnetic disk-use substrates 65 mm in diameter and 0.7 mm in thickness. The substrates obtained were cleaned with a 1.7 mass percent hydrofluosilicic acid ($H_2SiF$) aqueous solution and a 1 mass percent potassium hydroxide aqueous solution. They were then rinsed with pure water and dried. The surfaces of the substrates prepared from the glass of Examples were observed under magnification, revealing no surface roughness. The surfaces were smooth.

In (4) below, disk-shaped substrates prepared by the above-described method were used without any change to prepare magnetic disks. Separately, disk-shaped substrates prepared by the same method as above were immersed in molten salt in the form of potassium nitrate to obtain substrates having an ion-exchange layer produced by ion exchange on the surfaces thereof. Such ion-exchange processing is effective to increase the deflecting strength. The cross-sections (planes passing through the ion-exchange layer) of substrates sampled from multiple substrate subjected to ion-exchange processing were observed by the Babinet's method, revealing the formation of ion-exchange layers. Measurement by the above-described method of the deflecting strength of various substrates following ion-exchange processing revealed a value of equal to or greater than 20 kg. Disk-shaped substrates that have been ion-exchange processed in this manner can also be employed to prepare magnetic disks.

In the above example, the substrates were immersed in a molten salt in the form of a potassium compound to prepare substrates having ion-exchange layers. Instead of a molten salt in the form of a potassium compound, ion-exchange layers can also be formed by conducting ion-exchange processing by immersing the substrate in any one of:

(A) a mixed molten salt of a potassium compound and a rubidium compound;

(B) a mixed molten salt of a potassium compound and a cesium compound;

(C) a mixed molten salt of a rubidium compound and a cesium compound;

(D) a mixed molten salt of a potassium compound, rubidium compound, and cesium compound;

(E) the molten salt of a rubidium compound; or (F) the molten salt of a cesium compound.

Nitrates can be employed, for example, as the molten salt. The ion-exchange layer can be formed over the entire region of the substrate surface, formed over just the outer circumferential surface thereof, or formed over just the outer circumferential surface and inner circumferential surface thereof.

(4) Formation of Magnetic Disks

The following method was used to sequentially form an adhesive layer, undercoat layer, magnetic layer, protective layer, and lubricating layer on the main surface of each of the glass substrates obtained from the glasses of Examples, yielding magnetic disks.

First, a film-forming device in which a vacuum had been drawn was employed to sequentially form the adhesive layer, undercoat layer, and magnetic layer in an Ar atmosphere by the DC magnetron sputtering method.

At the time, the adhesive layer was formed as an amorphous CrTi layer 20 nm in thickness using a CrTi target. Next, a single-substrate, static opposed type film-forming device was employed to form a layer 10 nm in thickness comprised of amorphous CrRu as an undercoat layer by the DC magnetron sputtering method in an Ar atmosphere. Further, the magnetic layer was formed at a film forming temperature of 400° C. using an FePt or CoPt target to obtain an amorphous FePt or CoPt layer 200 nm in thickness.

The magnetic disks on which magnetic layers had been formed were moved from the film-forming device into a heating furnace and annealed at a temperature of 650 to 700° C.

Next, a protective layer comprised of hydrogenated carbon was formed by CVD method using ethylene as the material gas. Subsequently, PFPE (perfluoropolyether) was used to form a lubricating layer by the dip coating method. The lubricating layer was 1 nm in thickness.

The above manufacturing process yielded magnetic disks.

1. Evaluation of Glass (1) Glass Transition Temperature Tg, Coefficient of Thermal Expansion The glass transition temperature Tg and average linear coefficient of expansion $\alpha$ at 100 to 300° C. of each of the glasses were measured with a thermomechanical analyzer (TMA).

(2) Young's Modulus

The Young's modulus of each of the glasses was measured by the ultrasonic method.

(3) Specific Gravity

The specific gravity of each of the glasses was measured by Archimedes' method.

(4) Specific Modulus of Elasticity

The specific modulus of elasticity was calculated from the Young's modulus obtained in (2) above and the specific gravity obtained in (3) above.

(5) Acid Resistance

Substrates were prepared by the same methods as above from the glasses of Examples 1 to 11 and 13 to 20 and of Comparative Examples 1 and 2. Masks were applied to create unetched portions on portions of the substrates prepared, and with the masks in place, the glass substrates were immersed for a prescribed period in a 1.7 mass percent hydrofluosilicic acid aqueous solution maintained at 45° C. Subsequently, the glass substrates were withdrawn from the aqueous solution and the difference (in etching) of the masked portion and the unmasked portion was determined. This value was divided by the period of immersion to obtain the etching rate per unit time.

(6) Liquidus Temperature

A glass sample was charged to a platinum crucible, maintained for two hours at a prescribed temperature, removed from the furnace, and cooled. The presence or absence of crystal precipitation was then observed by microscope, and the temperature at which no crystals were observed was adopted as the liquidus temperature (L. T.).

The above results are given in Table 1.

2. Evaluation of Substrates (Surface Roughness, Surface Waviness)

A 5 μm×5 μm square region of the main surface of each of the substrates of Examples (surface on which the magnetic recording layer and the like were laminated) was observed by an atomic force microscope (AFM). The arithmetic average of the surface roughness Ra was measured for an area of 1 μm×1 μm and the arithmetic average of the surface roughness Ra was measured for an area of 5 μm×5 μm. The arithmetic average of the surface waviness Wa at a wavelength of 100 μm to 950 μm was also measured.

The arithmetic averages of the surface roughness Ra measured for an area of 1 μm×1 μm ranged from 0.15 to 0.25 nm for all of the glass substrates of Examples. The arithmetic averages of the surface roughness Ra measured for an area of 5 μm×5 μm ranged from 0.12 to 0.15 nm. And the arithmetic averages Wa of surface waviness at a wavelength of 100 μm to 950 μm were 0.4 to 0.5 nm. These ranges presented no problems for substrates employed in magnetic recording media.

TABLE 1

| | | Ex. 1 | | Ex. 2 | | Ex. 3 | | Ex. 4 | | Ex. 5 | | Ex. 6 | | Ex. 7 | | Ex. 8 | |
|---|---|---|---|---|---|---|---|---|---|---|---|---|---|---|---|---|---|
| | | Molar % | Mass % | Molar % | Mass % | Molar % | Mass % | Molar % | Mass % | Molar % | Mass % | Molar % | Mass % | Molar % | Mass % | Molar % | Mass % |
| Composition | $SiO_2$ | 66.2 | 62.4 | 62.0 | 59.8 | 65.4 | 61.2 | 60.2 | 59.4 | 64.8 | 60.8 | 63.6 | 59.5 | 57.6 | 55.9 | 65.5 | 61.8 |
| | $Al_2O_3$ | 0.5 | 0.8 | 0.4 | 0.7 | 0.4 | 0.6 | 0.4 | 0.7 | 0.4 | 0.7 | 0.4 | 0.7 | 2.1 | 3.5 | 0.4 | 0.6 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $Na_2O$ | 3.3 | 3.2 | 3.2 | 3.2 | 3.3 | 3.2 | 3.2 | 3.3 | 1.1 | 1.1 | 4.3 | 4.1 | 3.2 | 3.2 | 4.4 | 4.3 |
| | $K_2O$ | 6.2 | 9.2 | 4.4 | 6.6 | 6.2 | 9.1 | 3.3 | 5.1 | 7.8 | 11.4 | 1.1 | 1.6 | 2.8 | 4.3 | 6.1 | 9.0 |
| | $Cs_2O$ | 0.0 | 0.0 | 0.0 | 0.0 | 0.0 | 0.0 | 0.0 | 0.0 | 0.0 | 0.0 | 1.1 | 4.7 | 0.0 | 0.0 | 0.0 | 0.0 |
| | $MgO$ | 6.5 | 4.1 | 9.6 | 6.2 | 6.5 | 4.1 | 11.7 | 7.8 | 7.5 | 4.8 | 5.2 | 3.3 | 11.8 | 7.7 | 6.4 | 4.1 |
| | $CaO$ | 12.5 | 11.0 | 15.6 | 14.0 | 12.5 | 10.9 | 17.5 | 16.2 | 13.6 | 11.9 | 19.6 | 17.1 | 17.7 | 16.0 | 12.4 | 10.9 |
| | $SrO$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $BaO$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $ZnO$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $ZrO_2$ | 4.8 | 9.3 | 4.8 | 9.5 | 5.7 | 10.9 | 3.7 | 7.5 | 4.8 | 9.3 | 4.7 | 9.0 | 4.8 | 9.5 | 4.8 | 9.3 |
| | $TiO_2$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $La_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $Y_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $Yb_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $Ta_2O_5$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $Nb_2O_5$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $HfO2$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 | 100.1 | 100.0 | 100.0 |
| | $SiO_2+Al_2O_3+B_2O_3$ | 66.7 | 63.2 | 62.4 | 60.5 | 65.8 | 61.8 | 60.6 | 60.1 | 65.2 | 61.5 | 64.0 | 60.2 | 59.7 | 59.4 | 65.9 | 62.4 |
| | $Li_2O+Na_2O+K_2O+Cs_2O$ | 9.5 | 12.4 | 7.6 | 9.8 | 9.5 | 12.3 | 6.5 | 8.4 | 8.9 | 12.5 | 6.5 | 10.4 | 6.0 | 7.5 | 10.5 | 13.3 |
| | $Na_2O+K_2O$ | 9.5 | 12.4 | 7.6 | 9.8 | 9.5 | 12.3 | 6.5 | 8.4 | 8.9 | 12.5 | 5.4 | 5.7 | 6.0 | 7.5 | 10.5 | 13.3 |
| | $(Na_2O+K_2O)/$ $(Li_2O+Na_2O+K_2O+Cs_2O)$ | 1.0 | 1.0 | 1.0 | 1.0 | 1.0 | 1.0 | 1.0 | 1.0 | 1.0 | 1.0 | 0.8 | 0.5 | 1.0 | 1.0 | 1.0 | 1.0 |
| | $MgO+CaO+SrO+BaO$ | 19.0 | 15.1 | 25.2 | 20.2 | 19.0 | 15.0 | 29.2 | 24.0 | 21.1 | 16.7 | 24.8 | 20.4 | 29.5 | 23.7 | 18.8 | 15.0 |
| | $MgO+CaO$ | 19.0 | 15.1 | 25.2 | 20.2 | 19.0 | 15.0 | 29.2 | 24.0 | 21.1 | 16.7 | 24.8 | 20.4 | 29.5 | 23.7 | 18.8 | 15.0 |
| | $SrO+BaO$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $(MgO+CaO)/$ $(MgO+CaO+SrO+BaO)$ | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| | $Al_2O_3/(MgO+CaO)$ | 0.026 | 0.065 | 0.016 | 0.071 | 0.021 | 0.049 | 0.014 | 0.083 | 0.019 | 0.056 | 0.016 | 0.123 | 0.071 | 0.467 | 0.021 | 0.048 |
| | $Al_2O_3/CaO$ | 0.040 | 0.073 | 0.026 | 0.050 | 0.032 | 0.055 | 0.023 | 0.043 | 0.029 | 0.059 | 0.020 | 0.041 | 0.119 | 0.219 | 0.032 | 0.059 |
| | $A_mO_n$ | 4.8 | 9.3 | 4.8 | 9.5 | 5.7 | 10.9 | 3.7 | 7.5 | 4.8 | 9.3 | 4.7 | 9.0 | 4.8 | 9.5 | 4.8 | 9.3 |
| | $ZrO_2/A_mO_n$ | 1.0 | 1.0 | 1.0 | 1.0 | 1.0 | 1.0 | 1.0 | 1.0 | 1.0 | 1.0 | 1.0 | 0.5 | 1.0 | 1.0 | 1.0 | 1.0 |
| Physical characteristics | Specific gravity | 2.7 | | 2.8 | | 2.7 | | 2.8 | | 2.7 | | 2.8 | | 2.8 | | 2.7 | |
| | Glass transition temperature Tg[° C.] | 687 | | 692 | | 698 | | 690 | | 710 | | 701 | | 701 | | 670 | |
| | Average coefficient of linear expansion [×$10^{-7}$/° C.] | 79 | | 80 | | 79 | | 80 | | 75 | | 75 | | 79 | | 83 | |
| | Young's modulus [GPa] | 82 | | 88 | | 85 | | 90 | | 84 | | 90 | | 93 | | 83 | |
| | Specific modulus of elasticity[MNm/kg] | 30.4 | | 31 | | 31 | | 32 | | 31 | | 32 | | 33 | | 31 | |

TABLE 1-continued

| | | Ex. 9 1180 0.03 | | Ex. 10 1220 0.03 | | Ex. 11 1200 0.03 | | Ex. 12 Less than 1300 0.03 | | Ex. 13 1250 0.03 | | Ex. 14 Less than 1290 0.03 | | Ex. 15 Higher than 1300 0.07 | | Ex. 16 1220 0.03 | |
|---|---|---|---|---|---|---|---|---|---|---|---|---|---|---|---|---|---|
| | Liquidus temperature[° C.] Etching rate[μm/minute] | Molar % | Mass % | Molar % | Mass % | Molar % | Mass % | Molar % | Mass % | Molar % | Mass % | Molar % | Mass % | Molar % | Mass % | Molar % | Mass % |
| Composition | SiO₂ | 65.9 | 62.0 | 64.1 | 60.0 | 67.7 | 59.4 | 67.7 | 58.8 | 59.7 | 58.7 | 64.8 | 60.6 | 57.9 | 52.8 | 71.3 | 67.0 |
| | Al₂O₃ | 0.9 | 1.4 | 0.4 | 0.7 | 0.5 | 0.7 | 0.5 | 0.7 | 0.0 | 0.0 | 0.4 | 0.7 | 0.4 | 0.7 | 0.4 | 0.7 |
| | B₂O₃ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Li₂O | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Na₂O | 3.3 | 3.2 | 3.3 | 3.2 | 3.4 | 3.1 | 3.4 | 3.0 | 3.2 | 3.2 | 8.9 | 13.0 | 3.1 | 3.0 | 3.3 | 3.2 |
| | K₂O | 6.1 | 9.0 | 6.2 | 9.0 | 6.3 | 8.7 | 6.3 | 8.5 | 3.3 | 5.1 | 0.0 | 0.0 | 3.3 | 4.7 | 6.2 | 9.1 |
| | Cs₂O | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 6.5 | 4.1 | 6.5 | 4.1 | 2.1 | 1.3 | 2.1 | 1.2 | 11.6 | 7.6 | 7.5 | 4.7 | 8.3 | 5.1 | 6.5 | 4.1 |
| | CaO | 12.5 | 11.0 | 12.5 | 11.0 | 12.8 | 10.5 | 12.8 | 10.4 | 17.5 | 16.0 | 13.6 | 11.8 | 16.1 | 13.7 | 7.5 | 6.6 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 0.0 | 0.0 | 0.0 | 0.0 | 0.0 | 0.0 | 2.1 | 4.9 | 0.0 | 0.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | ZrO₂ | 4.8 | 9.3 | 4.8 | 9.3 | 4.9 | 8.9 | 4.9 | 8.8 | 4.7 | 9.4 | 4.8 | 9.2 | 6.7 | 12.6 | 4.8 | 9.3 |
| | TiO₂ | 0.0 | 0.0 | 2.2 | 2.7 | 0.0 | 0.0 | 0.0 | 0.0 | 0.0 | 0.0 | 0.0 | 0.0 | 2.1 | 2.5 | 0.0 | 0.0 |
| | La₂O₃ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Y₂O₃ | 0.0 | 0.0 | 0.0 | 0.0 | 2.3 | 7.4 | 0.0 | 0.0 | 0.0 | 0.0 | 0.0 | 0.0 | 0.0 | 0.0 | 0.0 | 0.0 |
| | Yb₂O₃ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Ta₂O₅ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Nb₂O₅ | 0.0 | 0.0 | 0.0 | 0.0 | 0.0 | 0.0 | 2.3 | 8.6 | 0.0 | 0.0 | 0.0 | 0.0 | 0.0 | 0.0 | 0.0 | 0.0 |
| | HfO2 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| | SiO₂ + Al₂O₃ + B₂O₃ | 66.8 | 63.4 | 64.5 | 60.7 | 68.2 | 60.1 | 68.2 | 59.5 | 59.7 | 58.7 | 65.2 | 61.3 | 58.3 | 53.5 | 71.7 | 67.7 |
| | Li₂O + Na₂O + K₂O + Cs₂O | 9.4 | 12.2 | 9.5 | 12.2 | 9.7 | 11.8 | 9.7 | 11.5 | 6.5 | 8.3 | 8.9 | 13.0 | 6.4 | 7.7 | 9.5 | 12.3 |
| | Na₂O + K₂O | 9.4 | 12.2 | 9.5 | 12.2 | 9.7 | 11.8 | 9.7 | 11.5 | 6.5 | 8.3 | 8.9 | 13.0 | 6.4 | 7.7 | 9.5 | 12.3 |
| | (Na₂O + K₂O)/ (Li₂O + Na₂O + K₂O + Cs₂O) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| | MgO + CaO + SrO + BaO | 19.0 | 15.1 | 19.0 | 15.1 | 14.9 | 11.8 | 14.9 | 11.6 | 29.1 | 23.6 | 21.1 | 16.5 | 26.5 | 23.7 | 14.0 | 10.7 |
| | MgO + CaO | 19.0 | 15.1 | 19.0 | 15.1 | 14.9 | 11.8 | 14.9 | 11.6 | 29.1 | 23.6 | 21.1 | 16.5 | 24.4 | 18.8 | 14.0 | 10.7 |
| | SrO + BaO | 0.0 | 0.0 | 0.0 | 0.0 | 0.0 | 0.0 | 0.0 | 0.0 | 0.0 | 0.0 | 0.0 | 0.0 | 2.1 | 4.9 | 0.0 | 0.0 |
| | (MgO + CaO)/ (MgO + CaO + SrO + BaO) | 1.0 | 1.0 | 1.0 | 1.0 | 1.0 | 1.0 | 1.0 | 1.0 | 1.0 | 1.0 | 1.0 | 1.0 | 0.92 | 0.79 | 1.0 | 1.0 |
| | Al₂O₃/CaO | 0.047 | 0.115 | 0.021 | 0.057 | 0.034 | 0.059 | 0.034 | 0.061 | 0.000 | 0.000 | 0.019 | 0.054 | 0.016 | 0.025 | 0.029 | 0.057 |
| | AₘOₙ | 0.072 | 0.127 | 0.032 | 0.064 | 0.039 | 0.067 | 0.039 | 0.067 | 0.000 | 0.000 | 0.029 | 0.059 | 0.025 | 0.051 | 0.053 | 0.106 |
| | ZrO₂/AₘOₙ | 4.8 | 9.3 | 7.0 | 12.0 | 16.3 | 7.2 | 17.4 | 9.4 | 9.2 | 8.8 | 15.1 | 4.8 | 9.3 | | | |
| | | 1.0 | 1.0 | 0.7 | 0.8 | 0.5 | 0.7 | 0.5 | 1.0 | 1.0 | 1.0 | 0.8 | 1.0 | 1.0 | | | |
| Physical characteristics | Specific gravity | 2.7 | | 2.7 | | 2.8 | | 2.8 | | 2.8 | | 2.7 | | 2.95 | | 2.6 | |
| | Glass transition temperature Tg[° C.] | 689 | | 686 | | 716 | | 710 | | 696 | | 727 | | 708 | | 692 | |
| | Average coefficient of linear expansion [×10⁻⁷/° C.] | 78 | | 74.6 | | 77.1 | | 75.7 | | 76.6 | | 77.2 | | 75.5 | | 73.3 | |
| | Young's modulus [GPa] | 84 | | 85 | | 86 | | 85 | | 88 | | 80 | | 94 | | 80 | |
| | Specific modulus of elasticity [MNm/kg] | 31 | | 31 | | 31 | | 30 | | 31.6 | | 30 | | 32 | | 30 | |

TABLE 1-continued

| | | 1220 | 1180 | Less than 1200 0.03 | | Less than 1200 — | | Less than 1300 0.04 | | Less than 1300 0.03 | | Less than 1300 0.03 | | Less than 1130 0.06 | | Less than 1300 0.03 | |
|---|---|---|---|---|---|---|---|---|---|---|---|---|---|---|---|---|---|
| Liquidus temperature[° C.] | | 1220 | 1180 | | | | | | | | | | | | | | |
| Etching rate[μm/minute] | | 0.03 | 0.03 | | | | | | | | | | | | | | |
| | | | | Ex. 17 | | Ex. 18 | | Ex. 19 | | Ex. 20 | | Ex. 20 | | Comp. Ex. 1 | | Comp. Ex. 2 | |
| | | | | Molar % | Mass % | Molar % | Mass % | Molar % | Mass % | Molar % | Mass % | Molar % | Mass % | Molar % | Mass % | Molar % | Mass % |
| Com-position | SiO₂ | | | 65.3 | 61.4 | 59.2 | 56.6 | 66.3 | 63.2 | 67.8 | 62.4 | 60.3 | 49.3 | 64.6 | 56.7 |
| | Al₂O₃ | | | 0.4 | 0.7 | 0.4 | 0.7 | 0.4 | 0.7 | 2.7 | 4.2 | 5 | 6.9 | 8.4 | 12.5 |
| | B₂O₃ | | | 0.8 | 0.9 | 0.0 | 0.0 | 0.0 | 0.0 | 0.0 | 0.0 | 0.0 | 0.0 | 0.0 | 0.0 |
| | Li₂O | | | 0.0 | 0.0 | 0.0 | 0.0 | 0.6 | 0.3 | 0.0 | 0.0 | 0.0 | 0.0 | 0.0 | 0.0 |
| | Na₂O | | | 3.3 | 3.2 | 3.2 | 3.2 | 4.4 | 4.3 | 4.5 | 4.3 | 8.0 | 10.3 | 14.8 | 13.4 |
| | K₂O | | | 6.2 | 9.2 | 3.3 | 5.0 | 4.5 | 6.7 | 5.2 | 7.5 | 0.0 | 0.0 | 2.7 | 3.7 |
| | Cs₂O | | | 0.0 | 0.0 | 0.0 | 0.0 | 0.0 | 0.0 | 0.0 | 0.0 | 0.0 | 0.6 | 0.0 | 0.0 |
| | MgO | | | 6.5 | 4.1 | 9.5 | 6.1 | 6.5 | 4.2 | 2.1 | 1.3 | 1.0 | 0.6 | 2.0 | 1.2 |
| | CaO | | | 12.6 | 11.1 | 15.4 | 13.7 | 12.5 | 11.1 | 12.8 | 11.0 | 15.0 | 11.5 | 2.0 | 1.6 |
| | SrO | | | 0.0 | 0.0 | 0.0 | 0.0 | 0.0 | 0.0 | 0.0 | 0.0 | 0.0 | 0.0 | 0.0 | 0.0 |
| | BaO | | | 0.0 | 0.0 | 0.0 | 0.0 | 0.0 | 0.0 | 0.0 | 0.0 | 8.0 | 16.8 | 2.5 | 5.6 |
| | ZnO | | | 0.0 | 0.0 | 4.3 | 5.5 | 0.0 | 0.0 | 0.0 | 0.0 | 0.0 | 0.0 | 0.0 | 0.0 |
| | ZrO₂ | | | 4.9 | 9.4 | 4.7 | 9.2 | 4.8 | 9.5 | 4.9 | 9.3 | 2.7 | 4.6 | 3.0 | 5.3 |
| | TiO₂ | | | 0.0 | 0.0 | 0.0 | 0.0 | 0.0 | 0.0 | 0.0 | 0.0 | 0.0 | 0.0 | 0.0 | 0.0 |
| | La₂O₃ | | | 0.0 | 0.0 | 0.0 | 0.0 | 0.0 | 0.0 | 0.0 | 0.0 | 0.0 | 0.0 | 0.0 | 0.0 |
| | Y₂O₃ | | | 0.0 | 0.0 | 0.0 | 0.0 | 0.0 | 0.0 | 0.0 | 0.0 | 0.0 | 0.0 | 0.0 | 0.0 |
| | Yb₂O₃ | | | 0.0 | 0.0 | 0.0 | 0.0 | 0.0 | 0.0 | 0.0 | 0.0 | 0.0 | 0.0 | 0.0 | 0.0 |
| | Ta₂O₅ | | | 0.0 | 0.0 | 0.0 | 0.0 | 0.0 | 0.0 | 0.0 | 0.0 | 0.0 | 0.0 | 0.0 | 0.0 |
| | Nb₂O₅ | | | 0.0 | 0.0 | 0.0 | 0.0 | 0.0 | 0.0 | 0.0 | 0.0 | 0.0 | 0.0 | 0.0 | 0.0 |
| | HfO2 | | | 0.0 | 0.0 | 0.0 | 0.0 | 0.0 | 0.0 | 0.0 | 0.0 | 0.0 | 0.0 | 0.0 | 0.0 |
| | Total | | | 100.0 | 100.0 | 100.0 | 100.0 | 100.0 | 100.0 | 100.0 | 100.0 | 100.0 | 100.0 | 100.0 | 100.0 |
| | SiO₂ + Al₂O₃ + B₂O₃ | | | 66.5 | 63.0 | 59.6 | 57.3 | 66.7 | 63.9 | 70.5 | 66.6 | 65.3 | 56.2 | 73.0 | 69.2 |
| | Li₂O + Na₂O + K₂O + Cs₂O | | | 9.5 | 12.4 | 6.5 | 8.2 | 9.5 | 11.3 | 9.7 | 11.8 | 8.0 | 10.3 | 17.5 | 17.1 |
| | Na₂O + K₂O | | | 9.5 | 12.4 | 6.5 | 8.2 | 8.9 | 11.0 | 9.7 | 11.8 | 8.0 | 10.3 | 17.5 | 17.1 |
| | (Na₂O + K₂O)/ (Li₂O + Na₂O + K₂O + Cs₂O) | | | 1.0 | 1.0 | 1.0 | 1.0 | 0.9 | 1.0 | 1.0 | 1.0 | 1.0 | 1.0 | 1.0 | 1.0 |
| | MgO + CaO + SrO + BaO | | | 19.1 | 15.2 | 24.9 | 19.8 | 19.0 | 15.3 | 14.9 | 12.3 | 24.0 | 28.9 | 6.5 | 8.4 |
| | MgO + CaO | | | 19.1 | 15.2 | 24.9 | 19.8 | 19.0 | 15.3 | 14.9 | 12.3 | 16.0 | 12.1 | 4.0 | 2.8 |
| | SrO + BaO | | | 0.0 | 0.0 | 0.0 | 0.0 | 0.0 | 0.0 | 0.0 | 0.0 | 8.0 | 16.8 | 2.5 | 5.6 |
| | (MgO + CaO)/ (MgO + CaO + SrO + BaO) | | | 1.0 | 1.0 | 1.0 | 1.0 | 1.0 | 1.0 | 1.0 | 1.0 | 0.67 | 0.42 | 0.62 | 0.33 |
| | Al₂O₃/CaO | | | 0.021 | 0.056 | 0.016 | 0.085 | 0.021 | 0.064 | 0.181 | 0.356 | 0.313 | 0.670 | 2.100 | 7.813 |
| | $A_mO_n$ | | | 0.032 | 0.063 | 0.026 | 0.051 | 0.032 | 0.063 | 0.211 | 0.382 | 0.333 | 0.600 | 4.200 | |
| | ZrO₂/$A_mO_n$ | | | 4.9 | 9.4 | 4.7 | 9.2 | 4.8 | 9.5 | 4.9 | 9.3 | 2.7 | 4.6 | 3.0 | 5.3 |
| Physical charac-teristics | Specific gravity | | | 1.0 | | 1.0 | | 1.0 | | 1.0 | | 1.0 | | 1.0 | |
| | | | | 2.7 | | 2.9 | | 2.7 | | 2.7 | | 3.0 | | 2.7 | |
| | Glass transition temperature Tg[° C.] | | | 675 | | 678 | | 662 | | 700 | | 729 | | 607 | |
| | Average coefficient of linear expansion [×10⁻⁷/° C.] | | | 77.8 | | 74.7 | | 80 | | 78.3 | | 83.2 | | 97.4 | |

TABLE 1-continued

| | | | | | |
|---|---|---|---|---|---|
| Young's modulus [GPa] | 83 | 91 | 86 | 83 | 79 | 77 |
| Specific modulus of elasticity [MNm/kg] | 31 | 32 | 32 | 31 | 27 | 29 |
| Liquidus temperature [° C.] | 1180 | Less than 1300 | 1130 | Less than 1200 | 1250 | 1000 |
| Etching rate [μm/minute] | 0.03 | 0.03 | 0.03 | 0.03 | 1.17 | 0.25 |

(Note)
$A_mO_n$ means a total content of $ZrO_2$, $TiO_2$, $La_2O_3$, $Y_2O_3$, $Yb_2O_3$, $Ta_2O_5$, $Nb_2O_5$, and $HfO_2$.

As shown in Table 1, the glasses of Examples had the three characteristics required of magnetic recording medium substrates, namely, high heat resistance (high glass transition temperature), high rigidity (high Young's modulus), and high coefficient of thermal expansion. From the results in Table 1, it was also determined that the glasses of Examples had high specific moduli of elasticity that were capable of withstanding high-speed rotation, had low specific gravities permitting substrate weight reduction, and had the good acid resistance required of magnetic recording media.

By contrast, the glasses of Comparative Examples 1 and 2 had low Young's moduli and specific moduli of elasticity, and thus lacked the characteristics demanded of magnetic recording medium substrates. This was primarily because the molar ratio of {(MgO+CaO)/MgO+CaO+SrO+BaO)} was less than 0.85 and the molar ratio of {$Al_2O_3$/(MgO+CaO)} exceeded 0.30.

From these results, it was determined that the present invention yielded a glass having the characteristics demanded of the magnetic recording medium substrate.

3. Evaluation of Magnetic Disks (1) Flatness

Generally, a degree of flatness of equal to or lower than 5 μm permits highly reliable recording and reproduction. The degree of flatness (the distance (difference in height) in the vertical direction (direction perpendicular to the surface) of the highest portion and lowest portion of the disk surfaces) of the surfaces of the various magnetic disks formed using the substrates of Examples by the above-described methods was measured with a flatness measuring device. All of the magnetic disks had degrees of flatness of equal to or lower than 5 μm. From these results, it was determined that the glass substrates of Examples did not undergo substantial deformation even when processed at high temperature during the formation of an FePt layer or CoPt layer.

(2) Load/Unload Test

The various magnetic disks formed using the substrates of Examples by the above methods were loaded into a 2.5-inch hard disk drive that rotated at a high speed of 5,400 rpm and subjected to a load/unload test ("LUL" hereinafter). The spindle of the spindle motor in the above hard disk drive was made of stainless steel. The durability of all of the magnetic disks exceeded 600,000 cycles. Further, although crash failures and thermal asperity failures will occur during LUL testing with deformation due to a difference in the coefficient of thermal expansion with the spindle material and deflection due to high-speed rotation, such failures did not occur during testing of any of the magnetic disks.

From these results, the present invention was determined to permit highly reliable recording and reproduction.

Magnetic disks prepared using the substrates of Examples by the above methods were loaded into the hard disk drive of a recording method in which the reversal of magnetization was assisted by irradiation with a laser beam (heat-assisted recording method) to prepare the information-recording device of a heat-assisted recording method. Separately, the magnetic disks that had been prepared were loaded into the hard disk drive of a recording method in which recording was assisted with microwaves (microwave-assisted recording method) to prepare the information-recording device of a microwave-assisted recording method. These information-recording devices, which combined magnetic materials of high Ku with energy-assisted recording, were capable of achieving high-density recording, as set forth above.

The present invention can provide an optimal magnetic recording medium for higher density recording.

What is claimed is:

1. A glass for a magnetic recording medium substrate, which comprises, denoted as molar percentages,
    50 to 75 percent of $SiO_2$,
    0 to 2.1 percent of $Al_2O_3$,
    0 to 3 percent of $Li_2O$,
    0 to 5 percent of ZnO,
    a total of $Na_2O$ and $K_2O$ of 3 to 15 percent,
    a total of MgO, CaO, SrO, and BaO of 14 to 35 percent,
    a total of $ZrO_2$, $TiO_2$, $La_2O_3$, $Y_2O_3$, $Yb_2O_3$, $Ta_2O_5$, $Nb_2O_5$, and $HfO_2$ of 2 to 9 percent,
    with a molar ratio of {(MgO+CaO)/(MgO+CaO+SrO+BaO)} falling within a range of 0.85 to 1, and a molar ratio of {$Al_2O_3$/(MgO+CaO)} falling within a range of 0 to 0.30,
    wherein the glass is an amorphous glass.

2. The glass for a magnetic recording medium substrate according to claim 1, which has an average coefficient of linear expansion of equal to or greater than $70 \times 10^{-7}/°$ C. at 100 to 300° C., a glass transition temperature of equal to or higher than 630° C., and a Young's modulus of equal to or higher than 80 GPa.

3. The glass for a magnetic recording medium substrate according to claim 1, which has a specific modulus of elasticity of equal to or greater than 30 MNm/kg.

4. The glass for a magnetic recording medium substrate according to claim 1, which has a specific gravity of less than 3.0.

5. The glass for a magnetic recording medium substrate according to claim 1, which has an acid resistance in the form of an etching rate of equal to or less than 0.09 μm/minute when immersed in 1.7 mass percent hydrofluosilicic acid aqueous solution maintained at 45° C.

6. The glass for a magnetic recording medium substrate according to claim 1, which has a liquidus temperature of equal to or lower than 1,300° C.

7. The glass for a magnetic recording medium substrate according to claim 1, which comprises, denoted as molar percentages,
    50 to 75 percent of $SiO_2$,
    0 to 3 percent of $B_2O_3$,
    0 to 2.1 percent of $Al_2O_3$,
    0 to 3 percent of $Li_2O$,
    0 to 5 percent of $Na_2O$,
    1 to 10 percent of $K_2O$,
    1 to 23 percent of MgO,
    6 to 21 percent of CaO,
    0 to 5 percent of BaO,
    0 to 5 percent of ZnO,
    0 to 5 percent of $TiO_2$,
    2 to 9 percent of $ZrO_2$.

8. The glass for a magnetic recording medium substrate according to claim 1, wherein a content of $SiO_2$ ranges from 57 to 68 molar percent.

9. The glass for a magnetic recording medium substrate according to claim 1, wherein a content of $Al_2O_3$ ranges from 0.1 to 2.1 molar percent.

10. The glass for a magnetic recording medium substrate according to claim 1, which contains substantially no $Li_2O$.

11. The glass for a magnetic recording medium substrate according to claim 1, wherein a content of ZnO ranges from 0 to 2 molar percent.

12. A magnetic recording medium substrate, which is comprised of the glass according to claim 1.

13. The magnetic recording medium substrate according to claim 12, which comprises an ion-exchange layer over a part or all of a surface thereof.

14. The magnetic recording medium substrate according to claim 13, wherein the ion-exchange layer has been formed by ion exchange with at least one alkali metal ion selected from the group consisting of K, Rb, and Cs.

15. The magnetic recording medium substrate according to claim 12, which is disk-shaped and has a main surface with surface properties (1) to (3) below:
- (1) an arithmetic average surface roughness Ra measured over an area of 1 μm×1 μm by an atomic force microscope of equal to or lower than 0.25 nm;
- (2) an arithmetic average surface roughness Ra measured over an area of 5 μm×5 μm of equal to or lower than 0.15 nm;
- (3) an arithmetic average surface waviness Wa at a wavelength of 100 μm to 950 μm of equal to or lower than 0.5 nm.

16. A magnetic recording medium, which comprises a magnetic recording layer on the substrate according to claim 12.

17. The magnetic recording medium according to claim 16, wherein the magnetic recording layer comprises either Fe and Pt or Co and Pt.

18. The magnetic recording medium according to claim 16, which is employed in an energy-assisted recording method.

19. The glass for a magnetic recording medium substrate according to claim 1, wherein the molar ratio of $\{(MgO+CaO)/(MgO+CaO+SrO+BaO)\}$ falls within a range of 0.99 to 1.

20. The glass for a magnetic recording medium substrate according to claim 1, wherein a molar ratio of $\{ZrO_2/(ZrO_2+TiO_2+La_2O_3+Y_2O_3+Yb_2O_3+Ta_2O_5+Nb_2O_5+HfO_2)\}$ falls within a range of 0.95 to 1.

* * * * *